United States Patent
Brockmann et al.

(10) Patent No.: US 11,128,903 B2
(45) Date of Patent: Sep. 21, 2021

(54) SYSTEMS AND METHODS OF ORCHESTRATED NETWORKED APPLICATION SERVICES

(71) Applicant: ACTIVEVIDEO NETWORKS, INC., San Jose, CA (US)

(72) Inventors: Ronald A. Brockmann, Los Gatos, CA (US); Maarten Hoeben, Amersfoort (NL); Gerrit Willem Hiddink, San Jose, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 0 days.

(21) Appl. No.: 16/721,125

(22) Filed: Dec. 19, 2019

(65) Prior Publication Data
US 2020/0128282 A1 Apr. 23, 2020

Related U.S. Application Data

(63) Continuation of application No. PCT/US2018/040118, filed on Jun. 28, 2018.
(Continued)

(51) Int. Cl.
*H04N 21/2387* (2011.01)
*H04N 21/234* (2011.01)
(Continued)

(52) U.S. Cl.
CPC ....... *H04N 21/2387* (2013.01); *H04N 21/234* (2013.01); *H04N 21/235* (2013.01);
(Continued)

(58) Field of Classification Search
CPC ............. H04N 21/2387; H04N 21/234; H04N 21/235; H04N 21/2662; H04N 21/435;
(Continued)

(56) References Cited

U.S. PATENT DOCUMENTS 7,127,735 B1 * 10/2006 Lee .................... H04N 7/17336
725/87
9,621,853 B1  4/2017 Yang et al.
(Continued)

FOREIGN PATENT DOCUMENTS

EP         2720435 A1    4/2014

OTHER PUBLICATIONS

ActiveVideo Networks, Inc., International Search Report and Written Opinion, PCT/US2018/040118, dated Oct. 28, 2018, 10 pgs.
(Continued)

*Primary Examiner* — Pinkal R Chokshi
(74) *Attorney, Agent, or Firm* — Morgan, Lewis & Bockius LLP

(57) ABSTRACT

A server computing device receives, from a client device, a digest segment generated by the client device. The digest segment corresponds to a first media stream segment received by the client device, and the digest segment includes a representation of the first media stream segment. The server computing devices determines, using the digest segment, a playback command that corresponds to the first media stream segment and transmits, to the client device, the playback command.

19 Claims, 29 Drawing Sheets

Related U.S. Application Data

(60) Provisional application No. 62/526,954, filed on Jun. 29, 2017.

(51) Int. Cl.

| | | |
|---|---|---|
| *H04N 21/235* | (2011.01) | |
| *H04N 21/472* | (2011.01) | |
| *H04N 21/2662* | (2011.01) | |
| *H04N 21/435* | (2011.01) | |
| *H04N 21/44* | (2011.01) | |
| *H04N 21/462* | (2011.01) | |
| *H04N 21/232* | (2011.01) | |
| *H04N 21/443* | (2011.01) | |

(52) U.S. Cl.
CPC ....... *H04N 21/2662* (2013.01); *H04N 21/435* (2013.01); *H04N 21/44* (2013.01); *H04N 21/47202* (2013.01); *H04N 21/232* (2013.01); *H04N 21/4431* (2013.01); *H04N 21/4622* (2013.01)

(58) Field of Classification Search
CPC ............. H04N 21/44; H04N 21/47202; H04N 21/4622; H04N 21/4431; H04N 21/232
See application file for complete search history.

(56) References Cited

U.S. PATENT DOCUMENTS

| | | | |
|---|---|---|---|
| 2005/0034152 A1 | 2/2005 | Matsumoto et al. | |
| 2006/0050973 A1* | 3/2006 | Ishikawa | H04N 21/6587 382/232 |
| 2006/0122946 A1* | 6/2006 | Fahmy | G06Q 20/3829 705/71 |
| 2008/0005676 A1* | 1/2008 | Evans | H04N 7/163 715/740 |
| 2010/0303146 A1* | 12/2010 | Kamay | H04N 21/2343 375/240.02 |
| 2010/0325657 A1* | 12/2010 | Sellers | H04N 21/2387 725/32 |
| 2013/0031222 A1* | 1/2013 | Molander | H04N 21/2387 709/219 |
| 2013/0204927 A1 | 8/2013 | Kruglikov et al. | |
| 2014/0282773 A1 | 9/2014 | Hurst et al. | |
| 2015/0215358 A1 | 7/2015 | Wang et al. | |
| 2016/0191627 A1* | 6/2016 | Huang | H04L 67/125 709/205 |
| 2017/0054765 A1* | 2/2017 | Tucker | G06F 9/45558 |

OTHER PUBLICATIONS

ActiveVideo Networks, Inc., International Preliminary Report on Patentability, PCT/US2018/040118, dated Dec. 31, 2019, 7 pgs.
ActiveVideo Networks, Inc., Extended European Search Report, EP18822807.6, dated May 25, 2020, 9 pgs.

* cited by examiner

SYSTEMS AND METHODS OF ORCHESTRATED NETWORKED APPLICATION SERVICES

RELATED APPLICATIONS

This application is a continuation of International Application No. PCT/US18/40118, filed Jun. 28, 2018, which claims priority to U.S. Provisional Application No. 62/526,954, filed Jun. 29, 2017, each of which is hereby incorporated by reference in its entirety.

FIELD OF ART

The present invention relates generally to controlling display of media by a client, and more particularly to controlling, by a server, media displayed by a client based on information received by the server from the client.

BACKGROUND

Application servers providing various remote applications to client devices have been in common use for several decades. Prior to the advent of broadband access to the Internet, these servers were primarily offered by cable television providers on a private network via the cable TV infrastructure. With the arrival of broadband content services, some application services are now hosted "in the cloud" on server systems providing service to client devices such as personal computer laptops, tablets and mobile phones.

Not to be confused with accessing webpages on a common web server, application servers execute an application on the server at a remote location and send the resulting output, usually in the form of a screen image, or sequence of images, or a video stream, to the client device which the user sees and interacts with. To the user, the application service appears to be running on the device in front of them while, in fact, it is being executed remotely.

These application server services have, to date, been reliant upon a one-to-one relationship with the client device and a remote server. Any combination of services has typically been managed by a process of merging services at the application server to which the client is connected.

With the evolution of Internet-based media services, a need exists to allow client devices of almost any type, that are capable of displaying video images, to connect to multiple application servers and to access multiple applications without having to funnel each service through a single point of contact which is typical of application services available today.

To deliver the above, there is a need to simulate the functionality of specialized computer hardware, operating systems, proprietary content protection schemes, applications, and other computing resources on legacy devices or devices not designed to process tasks with the needed speed, computational capability, or required memory resources. To address this need, computer system emulators have been developed to make available the functionality of advanced and often specialized computer platforms by duplicating their functionality on general purpose and often lower power computer platforms. Various components of computer systems under development can also be emulated to assess their behavior in a generic or less robust system or device environment.

This need to mimic (or virtualize) the functionality of certain computing resources in less robust environments, remains a constant issue. Though terms such as "emulation," "virtualization," and "remoting" are often used inconsistently in various contexts, these terms will be considered equivalent.

A server system may vary from dedicated computer hardware to software running in a general-purpose computer environment to a myriad of hybrid implementations allocating this functionality among a wide variety of hardware and software components. Further, software systems are typically embodied in physical non-transitory storage media such as hard disk drives, flash memory, and so forth.

One form of virtualization, sometimes referred to as "remote" virtualization, involves the interaction of two computing environments; one of which is a host server environment in which resides the actual computing resources to be virtualized, and the other in a remote guest or client device environment from which these resources are exploited. In this context, one can say that the "virtual" resources reside on the client device, while the actual resources reside in the host environment (although the host might also include additional virtual resources, such as virtual machines).

Commercially available remote desktop virtualization software currently enables users to remotely control applications running, by way of example, on their desktop computers at home or office from a client device, such as a smartphone or laptop, or from a remote location such as a hotel room. Such software enables such remote users to input events like keystrokes or screen touch events into a smartphone and see the results of such interactions on that device, while the applications being controlled are in fact executing on the host computer at the home or office. Thus, remote virtualization enables users to access, from a remote location, computing resources that, for a variety of reasons, are not otherwise available at the remote location. However, these solutions either require a high bandwidth and low latency connection between the server and client (such as is available on a Local Area Network or LAN), or do not support the more complex and immersive interactivity of modern media applications.

Existing interactive television systems have been deployed utilizing advanced application server technology enabling complex interactive TV applications to be deployed as a shared resource; while the complex computing needed to support an advanced user experience is performed in a central location on a shared resource and the output of said shared resource then being transmitted back to the user. Typically, a service manager is provided which assigns a virtual set-top application in a central facility to a client device, such as a cable TV set-top (e.g., in a user's home).

Many new interactive TV and video-on-demand (VOD) services are currently becoming available from services delivered by way of the Internet. Typically, these new services interact with a common web browser on a laptop, tablet, or smartphone or require a third-party application to run a dedicated client device such as a third-party Internet set-top or smart TV. There is a need to interact with these services without needing to rely on specialized client devices. However, relative to a common web browser or third-party application on a laptop, tablet or smartphone, a generic legacy TV set-top has limited resources in terms of processing power, graphical capabilities and memory, and is therefore typically not able to support most of these new interactive TV and VOD services due to such limitations.

There is a need for systems that remotely manage content displayed on a client. However, obtaining client information for media delivery management is bandwidth consuming due to the size of graphical data.

SUMMARY

Embodiments described herein are directed to improved systems and methods for updating a virtual client (e.g., in real-time) with a graphics state of a physical client without demanding a high level of bandwidth required to send media content from a physical client to a virtual client.

In accordance with some embodiments, a method performed at a server computing device for remotely processing a media stream is provided. The method comprises, at the server computing device having one or more processors and memory storing one or more programs for execution by the one or more processors, receiving, from a client device, a digest segment generated by the client device. The digest segment corresponds to a first media stream segment received by the client device, and the digest segment includes a representation of the first media stream segment. The method includes determining, using the digest segment, a playback command that corresponds to the first media stream segment and transmitting, to the client device, the playback command for controlling playback of the first media stream segment on a display communicatively coupled to the client device.

In some embodiments, the representation of the first media stream segment is a representation of a plurality of frames of video data of the first media stream segment.

In some embodiments, the method further comprises, generating a second media stream segment based on the digest segment. The second media stream segment includes the representation of the plurality of frames of the video data and additional data that is distinct from the video data. The playback command is determined using the second media stream segment.

In some embodiments, a second size of the generated second media stream segment is the same as a first size of the first media stream segment.

In some embodiments, a third size of the digest segment is smaller than the first size of the first media stream segment.

In some embodiments, generating the second media stream segment comprises reconstructing at least one respective frame of the plurality of frames of video data using the representation of the plurality of frames of the video data.

In some embodiments, wherein at least a portion of the second media stream segment is generated using random or pseudorandom data.

In some embodiments, prior to receiving the digest segment that corresponds to the first media stream segment, the method includes transmitting a request for a first media stream that includes the first media stream segment.

In some embodiments, prior to receiving the digest segment generated by the client device, the method includes receiving, from an orchestrator, an invocation communication that corresponds to request to execute instructions to run, by a virtual client virtual machine, a media application that corresponds to the media stream. The method includes, in response to receiving the invocation communication, executing, by the virtual client virtual machine, the media application that corresponds to the media stream.

In some embodiments, the representation of the first media stream segment does not include image content for at least one frame of the first media stream segment received by the client device.

In some embodiments, a non-transitory computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

In accordance with some embodiments, a method performed at a client device for remotely processing a media stream is provided. The method comprises, at the client device, receiving a media stream that includes a media stream segment having a segment header and a plurality of frames of video data, wherein the media stream segment has a first data size. The method further includes storing the media stream segment and generating a digest segment that corresponds to the media stream segment. The digest segment includes a representation of the video data of the plurality of frames and the digest segment has a second data size that is smaller than the first data size. The method further includes transmitting, to a remote device, the generated digest segment, and receiving, from the remote device, a command for playback of the media stream, wherein the command for playback of the media stream is at least partially based on the digest segment transmitted to the remote device. The method further includes, in response to receiving the command, displaying, on a display communicatively coupled to the client device, at least a portion of the stored media stream segment.

In some embodiments, a non-transitory computer readable storage medium storing one or more programs for execution by one or more processors of an electronic device is provided. The one or more programs include instructions for performing any of the methods described above.

In some embodiments, a client device is provided. The client device comprises one or more processors and memory storing one or more programs for execution by the one or more processors, the one or more programs including instructions for performing any of the methods described above.

In some embodiments, the representation of the video data of the plurality of frames includes the segment header.

In some embodiments, the representation of the video data of the plurality of frames includes at least one respective frame header that corresponds to a respective frame of the plurality of frames.

In some embodiments, the digest segment does not include image content for at least one respective frame of the plurality of frames.

In some embodiments, the representation of the video data of the plurality of frames includes an indication of a location and/or a data length of at least one frame of the plurality of frames of the media stream.

In some embodiments, the representation of the video data of the plurality of frames includes a frame identifier for at least one respective frame of the plurality of frames.

In some embodiments, the client device, before receiving the media stream, opens a session with a content server. The media stream is received from the content server.

In some embodiments, the media stream is received from a content storage device.

In some embodiments, the received command comprises an indication of a portion of the media stream to play back at the client device.

In some embodiments, the client device comprises memory that is limited to executing a predetermined set of functions based on an amount of CPU power of the client device.

In some embodiments, the client device comprises a graphics processing unit (GPU).

In some embodiments, the media stream segment is received from a first source and graphics data is received from a second source. In some embodiments, the client device generates a content stream that combines the graphics data with the stored media stream segment. In some embodiments, displaying the stored media stream segment includes displaying the graphics data combined with the stored media stream segment. In some embodiments, the first source is distinct from the second source.

In some embodiments, a computer readable storage medium storing one or more programs for execution by one or more processors of an electronic device is provided. The one or more programs include instructions for performing any of the methods described above.

In some embodiments, an electronic device (e.g., a client device) is provided. The client device comprises one or more processors and memory storing one or more programs for execution by the one or more processors, the one or more programs including instructions for performing any of the methods described above.

In accordance with some embodiments, a method is performed at a server computing device. The method includes, transmitting, to a client device, graphical data via a graphics API and receiving, from the client device, an indication of the graphics state of the client: device. The method includes, at the server computing device, generating, based on the indication of the graphics state of the client device, a rendering command for controlling graphical data displayed by the client device.

In some embodiments, the server computing device executes multiple applications.

In some embodiments, the indication of the graphics state of the client device includes an indication of a state of media content, displayed by the client device, that corresponds to the respective applications of the multiple applications.

In some embodiments, the rendering command for controlling media displayed by the client device corresponds to the graphics API.

In some embodiments, the graphics API is OpenGL.

In some embodiments, prior to transmitting the graphical data, the server computing device receives an invocation communication that corresponds to request to execute, by a virtual client virtual machine, a media application that corresponds to a media stream. In response to receiving the invocation communication, the virtual client virtual machine executes the media application that corresponds to the media stream.

In some embodiments, the server computing device receiving, from a client device, a digest segment generated by the client device. The digest segment corresponds to a first media stream segment received by the client device, and the digest segment includes a representation of a plurality of frames of video data of the first media stream segment. The server computing device determines, using the digest segment, a playback command that corresponds to the first media stream segment and transmits, to the client device, the playback command.

In some embodiments, the server computing device generates a second media stream segment based on the digest segment. The second media stream segment includes the representation of the plurality of frames of the video data and additional data that is distinct from the video data. The playback command is determined using the second media stream segment.

In some embodiments, the indication of the graphics state of the client device includes timing information. In some embodiments, the server computing device adjusts the graphical data based on the timing information. In some embodiments, the rendering command includes an instruction for transmitting the adjusted graphical data.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

It will be recognized that, in various embodiments, operations described with regard to the client may apply to a server and vice versa.

DETAILED DESCRIPTION

Figure 1:
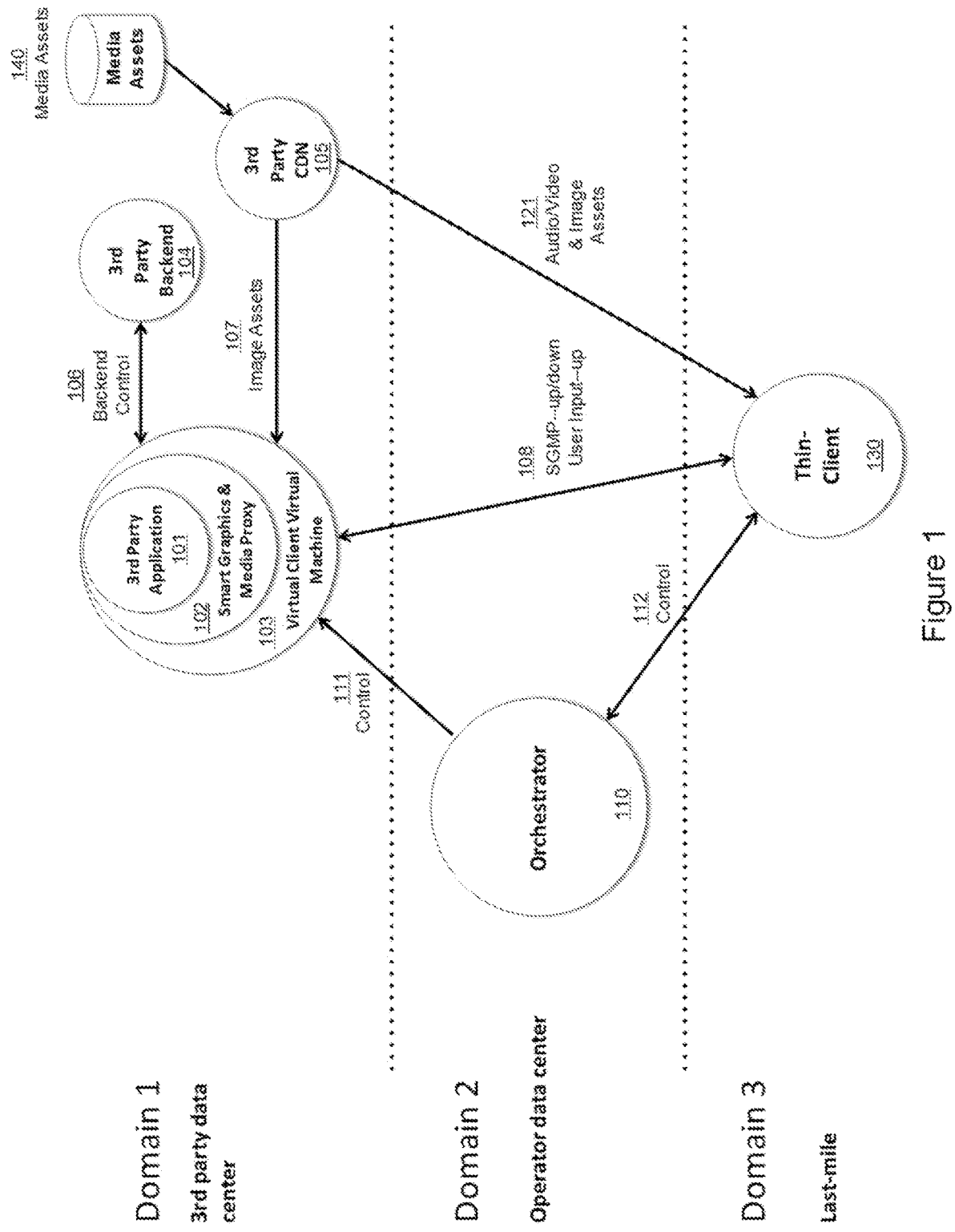
FIG. 1 is a top-level diagram illustrating a content delivery system, in accordance with some embodiments.

In accordance with some embodiments, computer systems provide an environment for third-party applications in which applications can run unmodified in a server environment in the third-party's domain (e.g., in a manner that is transparent to third-party applications that run on a client device). In some embodiments, an "orchestration" function (e.g., in the operator's domain) coordinates one or more third-party applications running in their respective server environments. In some embodiments, a client device (e.g., in the user's domain) provides a seamless experience to the user as though the third-party applications were running locally on the client device. In some embodiments, the orchestration function manages both user and client application-initiated events by coordinating with the client device. In some embodiments, the third-party's application resource requirements are determined based on a client device's capabilities (e.g., graphics capabilities) and/or environment (e.g., network conditions between server and client). In some embodiments, application and media resources (e.g., audio/video streams, images, scripts and/or digital-rights-management (DRM) information) are retrieved from third-party application back-ends and/or content-delivery-networks (CDN) (e.g., avoiding passing said resources through the third-party application in the server environment or the orchestration function).

Various embodiments described herein are directed to improvements of application server systems. In such systems, the user interacts with various interactive TV and VOD applications in a central facility such as a cable TV headend on a remote basis; with the user's interactions sent to the headend and video images transmitted back to the user's set-top. In this way, the user perceives the application as though it were running locally inside the set-top box. This mode of operation serves applications to the user with a typically high-level of interactivity measured by the responsiveness of the overall system. This responsiveness is achieved by operating the system within the confines of the cable TV network with high-bandwidth and low-latency between the client set-top box (STB) in the home and the server system in the headend.

A super-structure that combines application services from a headend with Internet-delivered services and third-party applications is provided. In some embodiments, translations of protocols such that any client device, including by way of example and without limitation, a legacy STB, an Internet set-top, a smart TV, a tablet, or a smartphone, can interact with—and consume content from—any source within or outside of the cable TV network. In some embodiments, the structure further operates completely apart from a cable TV network and coordinate services from the Internet at large.

In some embodiments, the applications include user interface elements rendered via a graphics API (e.g., OpenGL) with full-screen video and/or partial-screen video (e.g., managed via a video playback API such as OpenMAX). The applications are meant to be ported, installed and run locally on the client device. Instead, in some embodiments, methods are provided for running the application as, or similar to, unmodified Virtual Client Virtual Machines (VCVM) running on application servers in a different domain than the client's or central facility's domain. By virtualizing the used APIs, such as OpenGL and OpenMAX, application functionality can be separated from the rendering functionality. In some embodiments, the combining of disparate elements takes place in the client device under control of a respective smart-graphics-&-media-proxy (SGMP) at the application server. For example, in the client device, video is mixed with graphics by means of a graphics API, such as OpenGL, which treats the video as a texture layer to mix appropriately with other texture layers whether graphical or full motion. This is, compared to the complexity of a full client application, a relatively simple and low resource intensive process. Hence the thinned and application independent functionality running on the client device is referred to as Thin Client.

In some embodiments, a system that includes the remoted application and a client have a low-bandwidth, high-latency link traversing one or more network domains. Typically, high bandwidth, low-latency topologies and single-domain local area network topologies are used. This is especially important since VCVM and client device generally live in different network domains. For example, the VCVM is typically hosted in the third-party's data center domain, while the client operates at a different location (e.g., in the last-mile of the Internet, at the end-user's premises).

In some cases, CDNs are not located in geographically favorable positions relative to the client device (e.g., there is an unfavorable route from the CDN to the application server). To address this issue, in some embodiments, media content (e.g., audio and video streams) is streamed directly from one or more CDNs to the client device (e.g., without routing them through the application) and the (close to unmodified) application is "tricked" by the virtualized APIs in the SGMP such that it ingests, decodes and plays the media content.

In some embodiments, multiple applications from multiple services are combined by the system to be active concurrently for a single user and presented to the user as a single, seamlessly integrated application. For example, while a user is watching a show in a VOD application, a sports match (e.g., in which a user has indicated an interest) begins. A Program Guide application that is provided by an application that is distinct from the VOD application (and possibly running on another server which might not be related to VOD application), temporarily displays, over the VOD application, an indication (e.g., a small overlaid notification) that the sports broadcast of interest is about to begin.

In some embodiments, an "orchestrator" server coordinates the remoting process of video service or other applications from anywhere on the Internet to a plurality of client media devices (e.g., a legacy cable set-top box an Internet set-top, a laptop computer, a tablet, and/or a smartphone). In some embodiments, the typical functions of an orchestrator server are augmented with a coordination function (e.g., application or virtual machine life-cycle management) which controls how the different applications share and/or integrate on the client's screen. In some embodiments, the orchestrator server includes a virtual graphics processing unit (GPU) that translates application graphics and audio/video events in a media stream for the purpose of supporting legacy cable set-top boxes that do not have a GPU but can display an equivalent media stream.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

In some embodiments, the system and methods enable previously unobtainable efficiencies in the delivery of interactive on-screen user experiences to consumer cable television set-top-boxes, smart TV sets, and numerous other viewing platforms including Internet-connected set-tops, tablets, smartphones, or other mobile devices. The efficiencies are achieved by utilizing virtual set-top applications running on centrally-located virtual application servers. The efficiencies are gained by virtue of the fact that the centralized servers are a shared resource which is allocated on demand and, consequently, not required to be physically deployed for every user of the service.

For those skilled in the art, additional embodiments and applications will be apparent in view of the functionality described herein; including, but not limited to, hybrid hardware and/or software implementations of the functionality described herein, different server-side and client-side consumer electronics, and other devices, as well as numerous scenarios which avoid any requirement that users download and install native mobile apps. Moreover, it will also be apparent to those skilled in the art that the principles disclosed herein can be applied to a wide variety of interactive television as well as Internet-originated "apps" (or applications, even if not designed for mobile platforms) running on practically any computer platform found in set-top boxes, mobile devices, or otherwise, without departing from the novelty of the present disclosure.

In some embodiments, a first program running on a first machine interacts with certain internals of a second program running on a second machine. This process, referred to herein as "remoting," is the conveyance of the state of a first program using a graphics API (e.g., OpenGL) and/or a media playback API (e.g., OpenMAX) from a first application running on a first machine (e.g., a server somewhere on the Internet (also known as running "in the cloud") to a second program on a second machine (e.g., a client).

In some embodiments, the remoting system described herein realizes a beneficial separation of control information from data information between network domains.

Various embodiments described herein allow for running the media playback control application on a virtual-client-virtual-machine in a third-party network domain that is different from the operator's network domain and different from the client device's domain. Media assets, such as images and audio/video assets, are directly retrieved and processed by the client without the need to route the data through the media playback control application.

FIG. 1 is a top-level diagram illustrating a content delivery system, in accordance with some embodiments. Components of the content delivery system operate within three domains. Domain 1 is associated with one or more third parties (e.g., one or more content providers) at a third party data center. In some embodiments, a third-party application 101 is deployed in a third-party data center (domain 1), provided by the third-party and connected 106 to a third-party application-specific backend 104. Third-party application-specific backend 104 performs operations associated with billing, user authentication, content access, and/or digital rights management. The third-party data center includes one or more servers that includes the modules, networks, and storage elements described with regard to domain 1. In some embodiments, third party-application 101 is configured to generate a media stream by combining user interface graphics (e.g. rendered via a Graphics API 801 (shown in FIG. 8)) with media assets (e.g., managed via a media playback API 810 (FIG. 8)). In some embodiments, the application 101 executes within a virtual-client-virtual-machine 103 (VCVM) on an application server 2300 (FIG. 23) of the third-party data center. In some embodiments, VCVM 103 includes a smart-graphics-&-media-proxy 102 (SGMP), described in detail below with regard to FIG. 8. In some embodiments, media assets 140 (e.g., images, audio, and/or video assets) are provided (e.g., via connection 107) to VCVM 103 by a media source (e.g., media stored on one or more servers that are separate from one or more servers on which application 101 executes) such as a third-party CDN server 105. Because third-party application 101 is configured to generate a media stream that includes user interface graphics and media content (e.g., video) received from a content source, the system shown in FIG. 1 does not require an intermediary stitcher (e.g., such as a cable television system headend in domain 2) to mix graphics from an application 101 with video. In addition, in some embodiments, passing the video through the application's media playback stack is not required.

In some embodiments; the third party application 101 executed on VCVM 103 comprises an application associated with a media content provider. For example, a user of client device (e.g., thin client 130) may request content from a first media content provider. As shown in FIG. 1, the first media provider associated with third-party CDN 105 sends (e.g., via connection 121) media assets to the client device. For example, CDN 105 sends a video stream to client 130. In some embodiments, the client 130 sends (e.g., using a graphics API such as OpenGL) a graphics state of the client device to the VCVM 103. The graphics state of the video stream includes, for example, pixel information (e.g., openGL from the client), timing information (e.g., based on latency between the CDN 105 and the client 130), playback information (e.g., based on user inputs/controls at the client)

and/or a digest stream (e.g., generated by the client device). For example, the client 130 sends a digest of the video stream (or video stream segment) to the VCVM 103 such that the SGMP 102 can process the digest (or other graphics state information), as described further below with regard to FIGS. 10-11. In this way, the VCVM 103 is updated (e.g., in real-time and/or periodically) regarding the graphics state at the client 130 and can, in some embodiments, communicate the client's current graphics state to an orchestrator 110.

Domain 2 is associated with an operator data center. For example, the operator data center may be associated with a cable television system provider. In some embodiments, the operator data center is associated with a service provider distinct from the service provider(s) associated with the third party data center. In some embodiments, orchestrator 110, which is situated in the operator's network (domain 2), is configured to (1) manage client sessions, (2) control playback (e.g., start, end, pause, and/or resume) of media processed by application 101, (3) signal bandwidth settings to the SGMP 102, and/or (4) provide conditional access and digital rights management (DRM) related information to the SGMP 102. In some embodiments, the orchestrator 110 invokes an instance of VCVM 103 (e.g., in response to an input on a client device (e.g., thin client 130)). In some embodiments, the orchestrator 110 receives input, via connection 112, from a user of client device 130 corresponding to a control (e.g., a playback control) and forwards the control, via connection 111, to the VCVM. In some embodiments, the orchestrator processes the control and a command to the VCVM in order to control the graphics output by VCVM 103.

Domain 3 is associated with a "last-mile," referring to one or more client devices associated with one or more users. For example, the one or more client devices include a STB (e.g., a STB that includes a graphical processing unit (GPU) or a legacy STB), an Internet set-top, a smart TV, a tablet, a smartphone, and/or an internet of things (TOT) device. Because the third-party Application 101 is executed on an instance of a VCVM 103 in Domain 1, the computing power (e.g., CPU power) required of the client device is application-independent. Thus, the client device(s) may be thin-clients. In some embodiments, the client device 130 does not run multiple applications, each application associated with a distinct content provider, in order to access media content from each of the content providers. Instead, a single (e.g., generic) application (e.g., associated with the operator data center or another provider) runs on the client device and the client device communicates, via connection 108, the graphics state of the client device to the VCVM 103 such that the VCVM 103 can execute the processing of the media content (e.g., combining user interface graphics with video).

In some embodiments, as described in more detail below with respect to FIG. 10, commands to Get AV Segment 1010 (e.g., commands from the SGMP 102 in the third-party application 101) to the application-proxy 1911 (e.g., 1911*a*-1911*c*, FIG. 19) in the client 130 cause the client 130 to get 1011 audio/video segments 1101 from a CDN 105, and cause the client to return a digest 1109 (FIG. 11) of those segments to the SGMP 102. The SGMP 102 reconstructs the digest by means of a generator 815 (FIG. 8) into a reconstructed segment 1111 (FIG. 11), from the digest for the application to receive 1015 via a network API 810 and play 1016 or decode via a media playback API 812 as if they were the original segments. The API calls 1016 to the media playback API 812 to decode the reconstructed audio/video segments that are forwarded or remoted 1018 to the client as references to the original segments 1101. The client decodes the segments, using its local decoder API 1930 to a display plane or a graphics texture and combines the decoded video with graphics from the graphics related stack 819 of the SGMP under the control of the SGMP.

Figure 12:
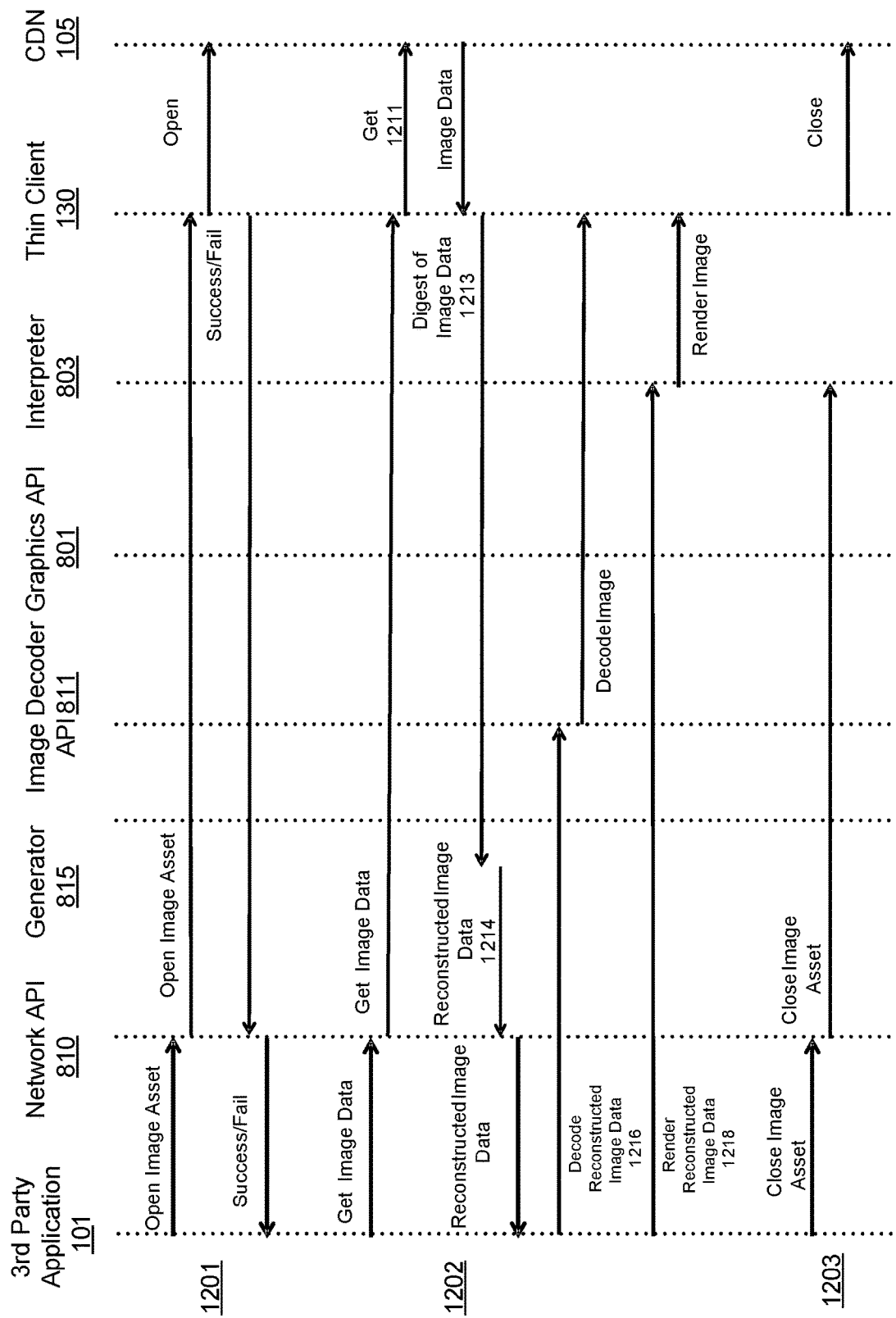
FIG. 12 is a state-flow diagram illustrating control and data flow for image assets in the system between a third-party application, the SGMP sub-system, and a client device in accordance with some embodiments.

In some embodiments, as illustrated in more detail in FIG. 12, image assets retrieved by the third-party application 101 from the third-party CDN 105 may follow an equivalent path, to the path for audio/video assets. However, as a matter of optimization and for those images for which the application or the SGMP requires the actual image data, the application may also or exclusively get the image assets 107 directly from the CDN, as shown in FIG. 1. The decision to have the client get the image from the CDN and pass back a digest to the application or have the application directly get the image from the CDN is under the control of the SGMP. An example of a decision flowchart for such a process is provided in FIG. 20. To the skilled reader, it may be clear that it is preferred to have the image asset available on the client before the application. In some embodiments, the image may first have to be forwarded to the client, or the client must first get the image itself before the client can render it. If the client has already retrieved 1211 the asset ahead of the application, a simple reference in-band with the rendering primitives 1219 suffices. Moreover, if the application does not use the pixels, a digest of image data 1213 of the image (e.g., image data including a unique id and the image's dimensions) suffices for the SGMP to reconstruct a substitute image 1214 for the application to decode 1216 and pass as texture material 1218 to the graphics API.

Figure 2:
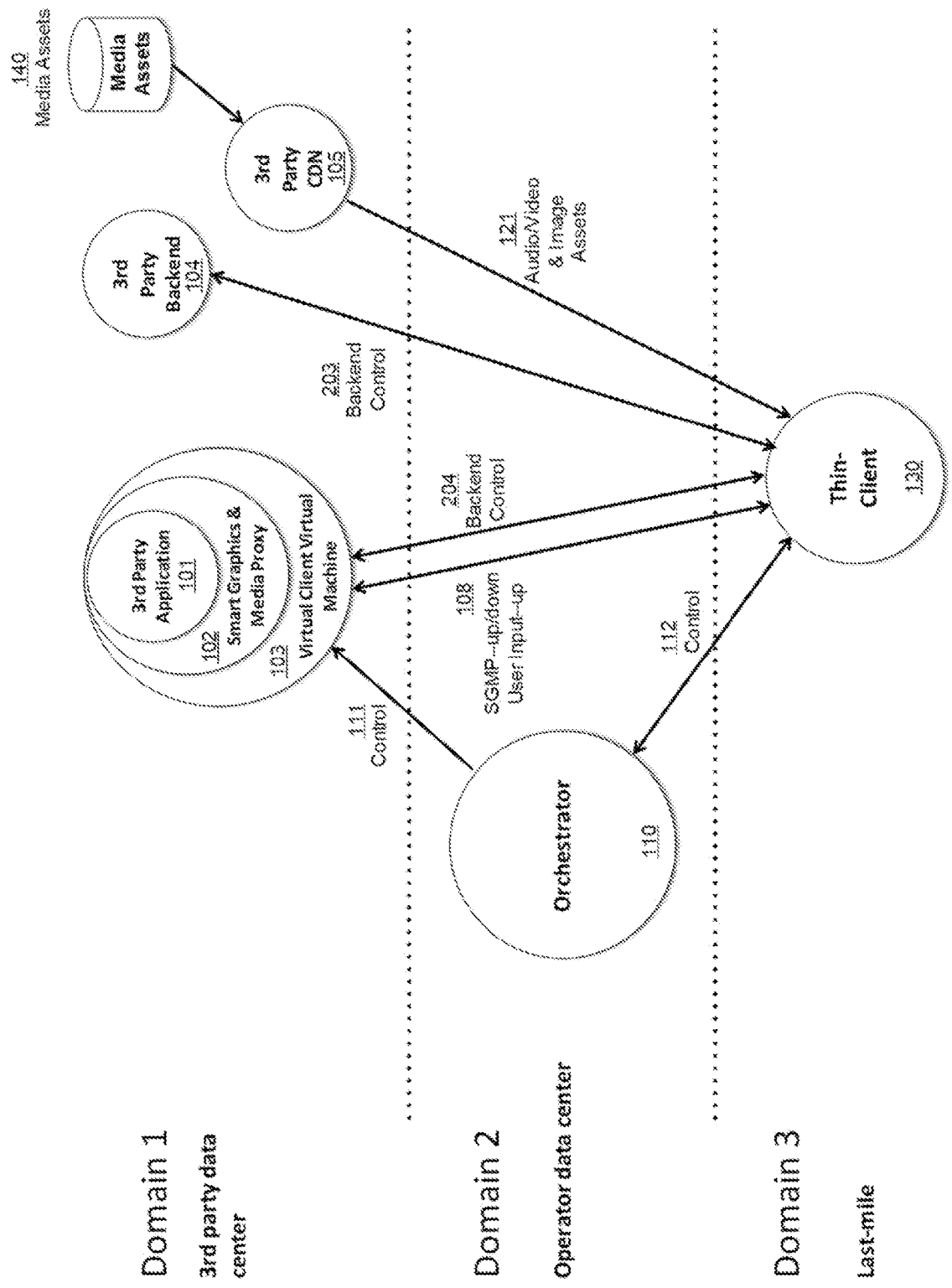
FIG. 2 is a top-level diagram illustrating a content-delivery system that supports third-party applications that require connectivity through a single IP address, in accordance with some embodiments.

FIG. 2 depicts a top-level diagram illustrating a content delivery system that supports third-party applications that require connectivity through a single IP address, in accordance with some embodiments. For example, third-party application(s) 101 and associated third-party backend(s) 104 and CDN(s) 105 require session-related communication to come from a single network node (e.g., the client 130). This requirement may be enforced by the third-party for various reasons. For example, a service is a paid subscription service that allows only one session (e.g., running on one client) for said subscription to be active at a time. In this case, the client 130 uses the application proxy 1911 (e.g., one of Application Proxy 1911*a* or 1911*b*, or 1911*c*) in the client (shown in FIG. 19) to function as a proxy for all network connectivity between the application 101, backend 104, and CDN 105. In some embodiments, backend control (e.g., user authentication via client 130 and/or rights management for content delivery) and CDN media assets 121 are routed through the client (whereas in other embodiments, media assets sent directly to the VCVM). For example, in FIG. 1, backend control 106 and/or a portion of the media assets (via connection 107) from CDN 105 are sent directly to the VCVM 103. For media assets 121 (e.g., audio/video and image assets), the client performs the same functions on behalf of the SGMP 102 as in the embodiment depicted by FIG. 1. In some embodiments, media (e.g., image assets) are, under control of the SGMP, forwarded (e.g., unmodified) from the client 130 to application server 2300. In some embodiments, data corresponding to media (e.g., a digest corresponding to video) is transmitted from client 130 (e.g., or client 2400) to application server 2300 (e.g., as described with regard to FIG. 12). In some embodiments, backend control is routed to application server 2300 through client 130 (e.g., unmodified), as indicated at 203 and 204.

Figure 3:
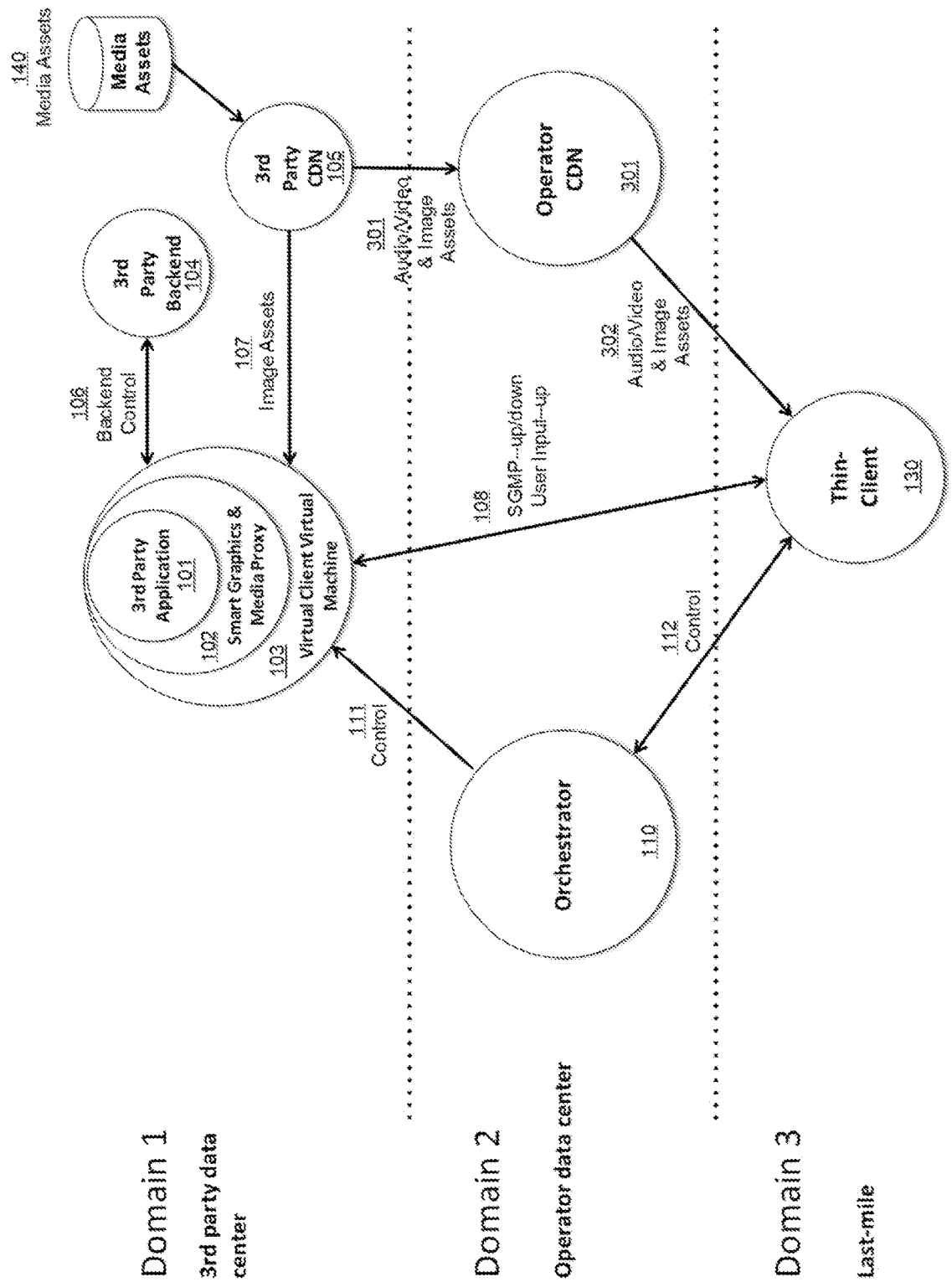
FIG. 3 is a top-level diagram illustrating a system with a content-delivery-network (CDN) in an operator domain, in accordance with some embodiments.

FIG. 3 is a top-level diagram illustrating a system with a content-delivery-network (CDN) in an operator domain, in accordance with some embodiments. As shown, domain 2, in addition to hosting orchestrator 110, also hosts an Operator CDN 301 that contains media assets 302 (e.g., the same or equivalent or additional assets as media assets 301 of the third-party CDN 105). There are various reasons why an operator (e.g., associated with a first provider distinct from a second provider associated with CDN 105) would want to serve client 130 media assets from its own CDN 301. For example, an operator CDN 301 is used when it is able provide content with higher quality (e.g., higher resolution and/or higher transmission rate) for clients 130 in the operator's network compared with content delivery to clients 130 by the third-party CDN 105, it may be cheaper for the operator to serve assets from its own domain rather than getting them from another domain, or the third-party may have assets in a codec or container format unsupported by the operator's client devices. In some embodiments, the operator processes (e.g., transcodes or trans-muxes) media assets 301 and stores the processed assets in its own CDN 301.

Figure 4:
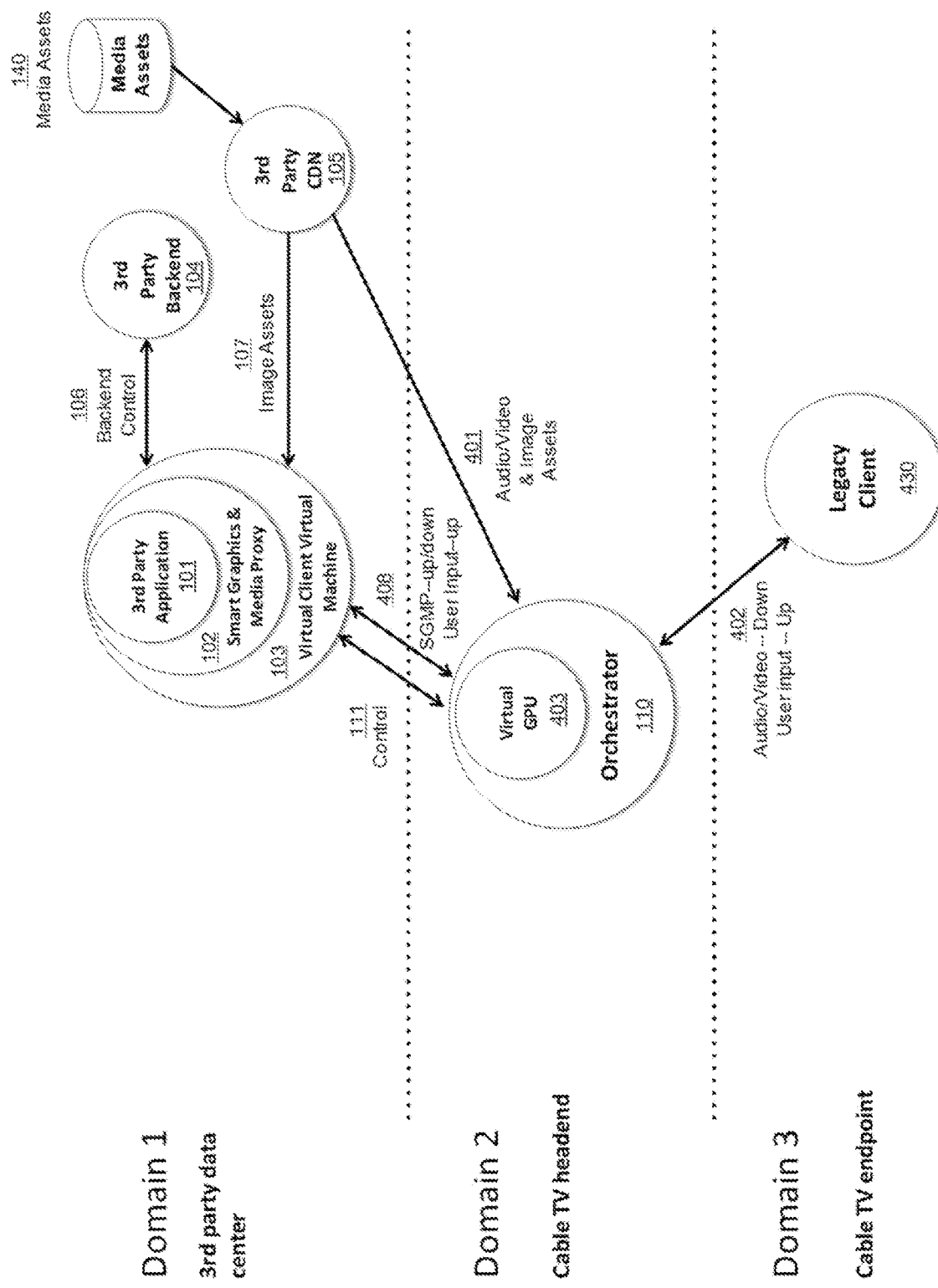
FIG. 4 is a top-level diagram illustrating a content-delivery system that supports legacy set-top boxes, in accordance with some embodiments.
Figure 5:
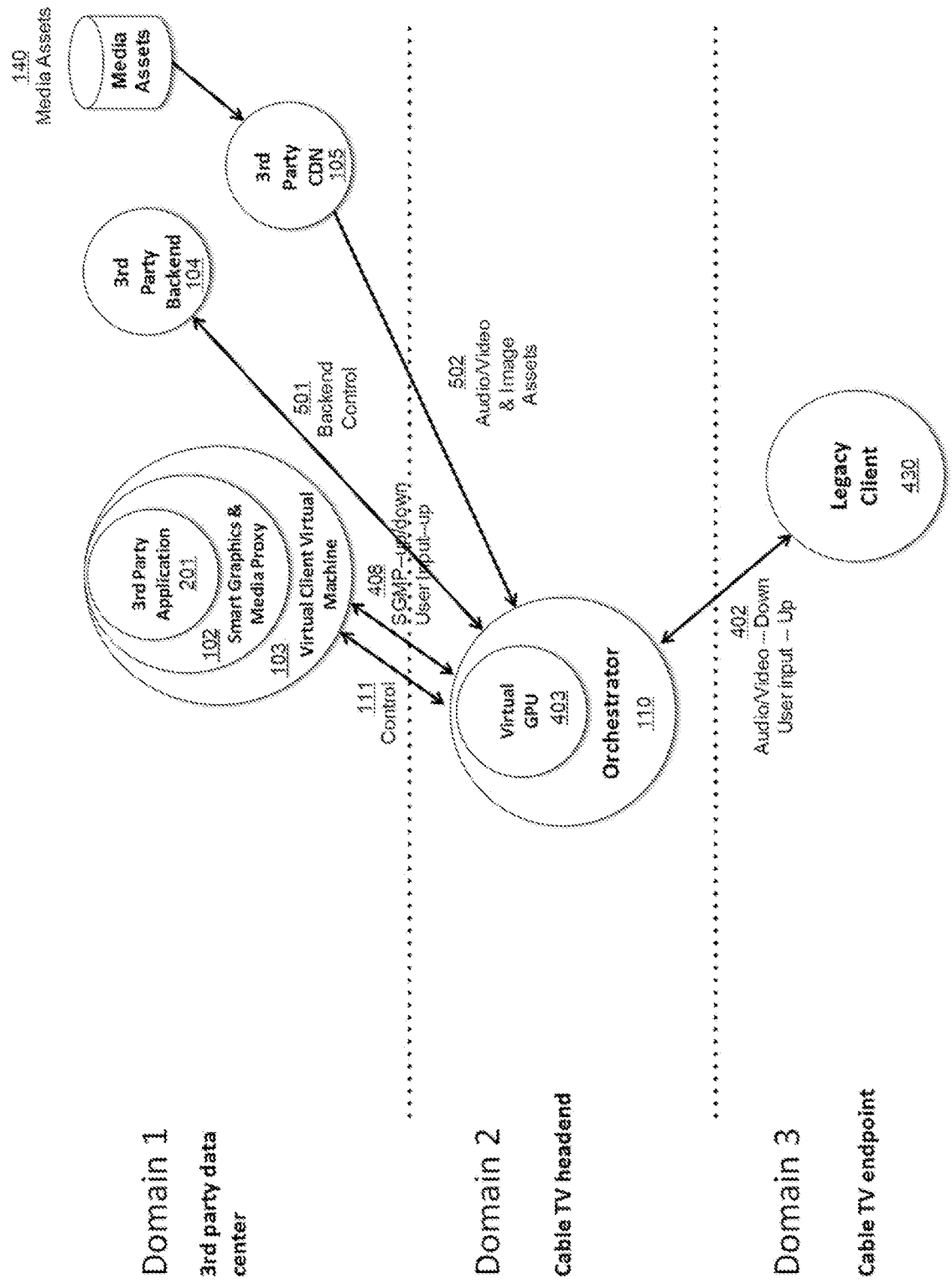
FIG. 5 is a top-level diagram illustrating a content-delivery system that supports third-party applications that require connectivity through a single IP address and legacy set-top boxes, in accordance with some embodiments.
Figure 6:
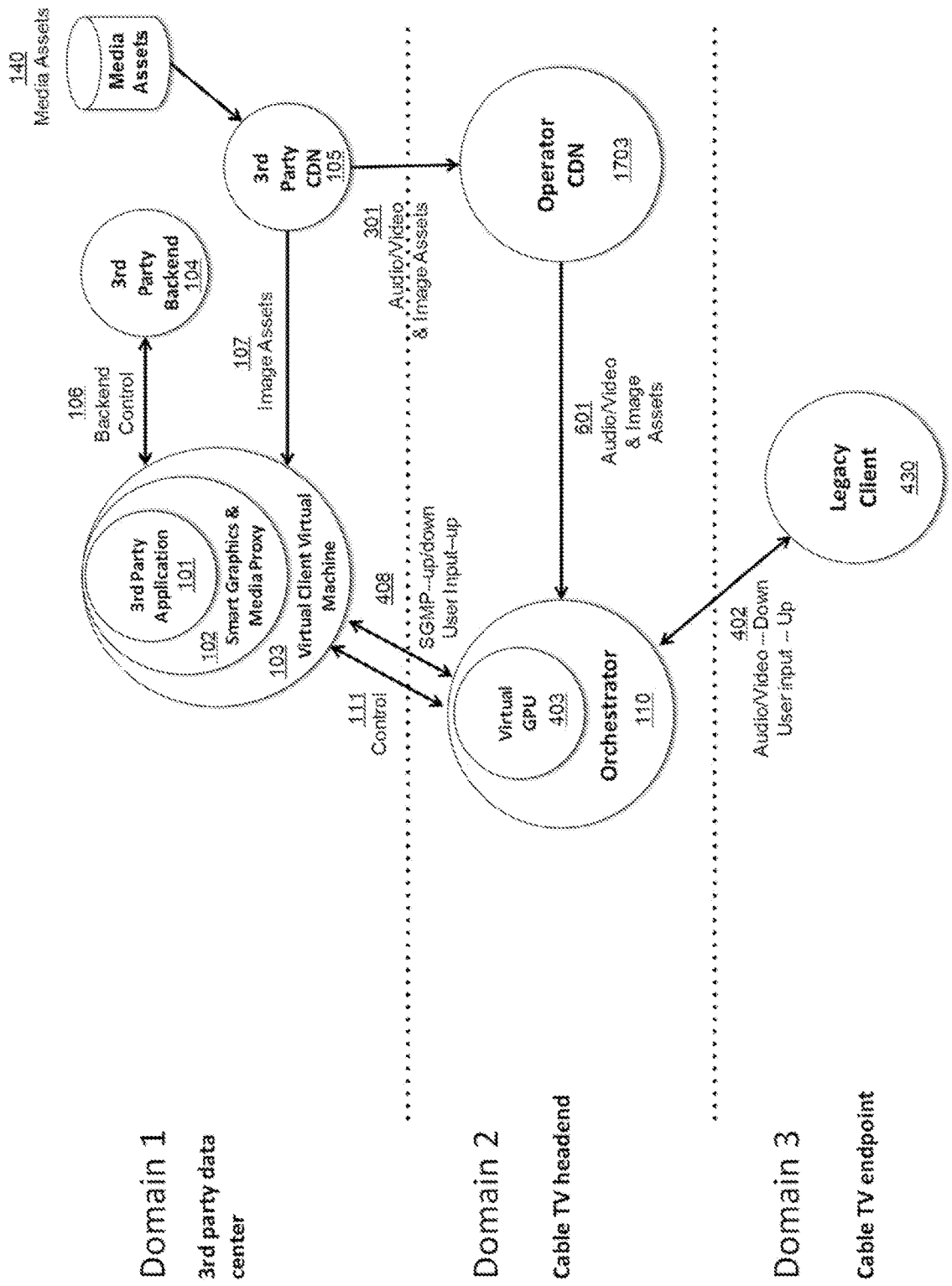
FIG. 6 is a top-level diagram illustrating a system that has a content-delivery-network (CDN) in an operator domain and that supports legacy set-top boxes, in accordance with some embodiments.

FIGS. 4, 5 and 6 depict embodiments similar to the embodiments represented in, respectively, FIGS. 1, 2 and 3, modified for support of client devices (e.g., Legacy Client 430) that do not have a GPU. In some embodiments, to support client devices that do not have a GPU, the orchestrator 110 includes virtual GPU 403, as shown in FIGS. 4-6.

As illustrated in FIG. 4, in some embodiments, third-party CDN 105 sends media assets 401 to orchestrator 110 (e.g., instead of directly to the client 130 as shown in FIGS. 1-3) so that GPU 403 can render the graphics. The orchestrator 110 communicates the graphics state of the Virtual GPU to the VCVM via connection 408. In some embodiments, orchestrator 110 receive user input from the legacy client 430 via connection 402. In some embodiments, orchestrator 110 sends rendered media assets (e.g., graphics) to the legacy client 430 via connection 402.

As illustrated in FIG. 5, in some embodiments, third-party CDN 105 sends media assets 502 to orchestrator 110. In some embodiments, third-party backend 104 communicates backend control 501 directly to orchestrator 110 (e.g., instead of to VCVM 103).

As illustrated in FIG. 6, in some embodiments, the third-party CDN 105 sends media assets 301 to an operator CDN 1703. The operator CDN 1703 may have additional assets than what is provided by CDN 105 (e.g., assets at the operator CDN are provided by the operator instead of the third-party). Operator CDN 1703 sends media assets (e.g., audio/video and image assets) via connection 601 to orchestrator 110.

Figure 7:
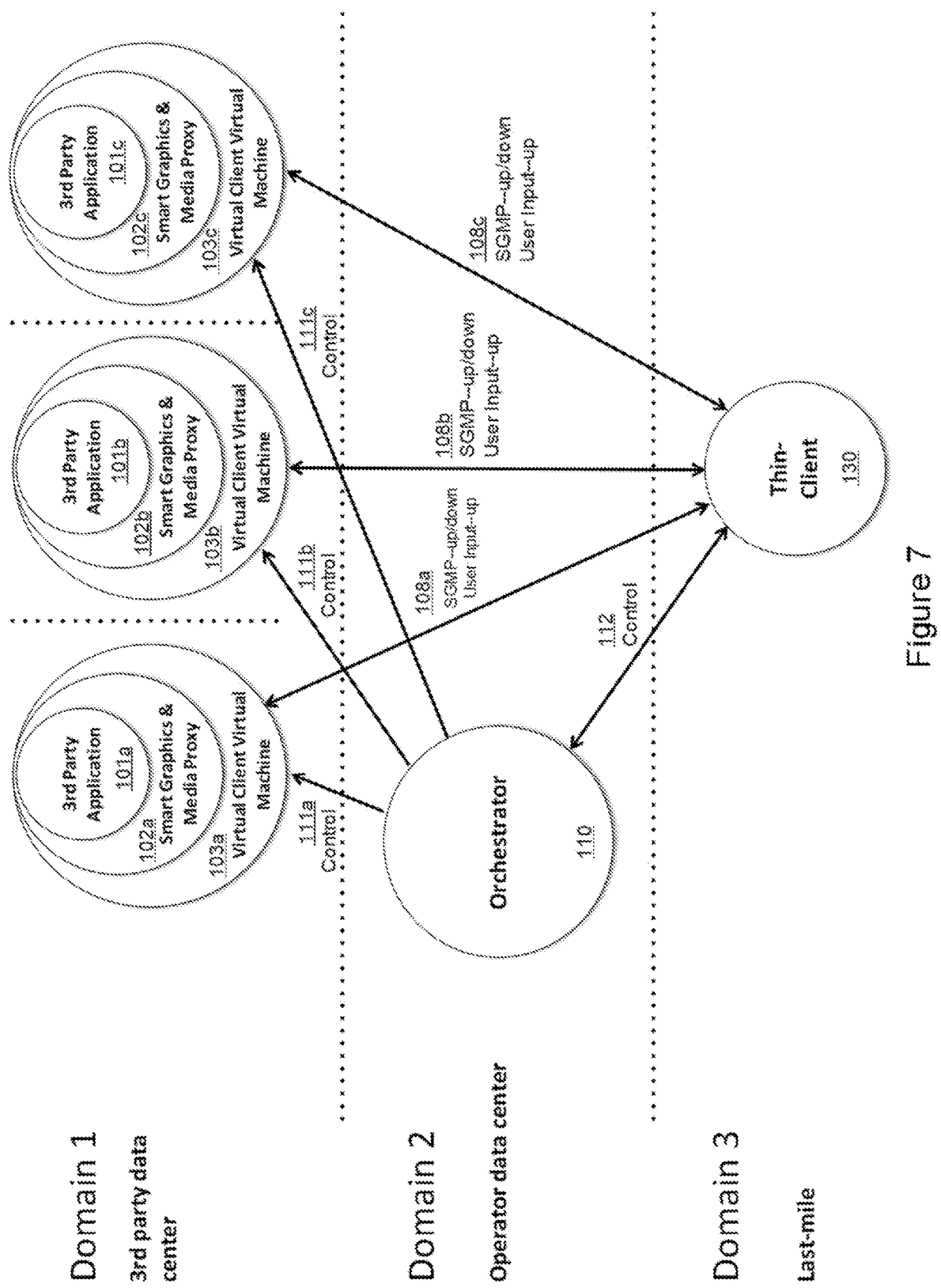
FIG. 7 is a top-level diagram depicting a session with multiple concurrent applications connected to a single client under the control of the orchestrator, in accordance with some embodiments.

FIG. 7 is a top-level diagram depicting a session with multiple concurrent applications connected to a single client under the control of the orchestrator, in accordance with some embodiments. In some embodiments, as shown in FIG. 7, the orchestrator 110 invokes a plurality of instances of distinct VCVMs (e.g., including VCVM 103a, VCVM 103b and VCVM 103c), each VCVM associated with a respective third-party CDN (e.g., including CDN 105), and provides a client device (e.g., thin client 130) with instructions to integrate (e.g., display concurrently) media content (e.g., audio/video and image assets) from the plurality of CDNs. In this manner, the client device is enabled to access media content from a plurality of CDNs without running a plurality of distinct applications (each application associated with a distinct CDN of the plurality of CDNs) at the client device. Each instance of the VCVM 103a-103c has a respective SGMP 102a-102c and a respective third party application 101a-101c executing within the VCVM.

As shown in FIG. 7, multiple third-party applications 101a, 101b and/or 101c may be active concurrently (e.g., have open sessions with) on a client device 130 from application servers that are not necessarily synchronized with each other (e.g., are associated with distinct providers), yet are presented to the user as a single, seamlessly integrated application. In some embodiments, the orchestrator 110 determines, based on control 112 from the client device, control instructions 111a-111c to communicate to VCVMs 103a-103c, respectively. For example, if a user of client device 130 requests first content (e.g., or inputs a playback control for the first content) from a first provider associated with third-party application 101a, the orchestrator 110 sends control instruction 111a to VCVM 103a. Orchestrator 110 also communicates Smart Graphics Media Proxy (SGMP) information to the VCVM such that the VCVMs 103a-103c are updated regarding the graphics state of client device 130. For example, a program guide application generates information for displaying information (e.g., a small overlaid notification or icon) indicating that a sports broadcast (e.g., from an application that is distinct from the program guide application) is about to begin. This requires seamless integration of two independent (e.g., distinct) applications by window manager 1920 (FIG. 19) within client device 130. In some embodiments, orchestrator 110 (FIG. 9) commands system-service-coordinator 910 (SSC) to send control instructions via orchestrator connection 112 to set-top-application-controller 1910 (STAC) via commands to the set-top-service-coordinator 1901 (STSC) of the next-generation-set-top 130. The STSC 1901 assigns a set-top-application-proxy 1911 (STAP) to be in communication with the VCVMs (103) that run the application.

Figure 8:
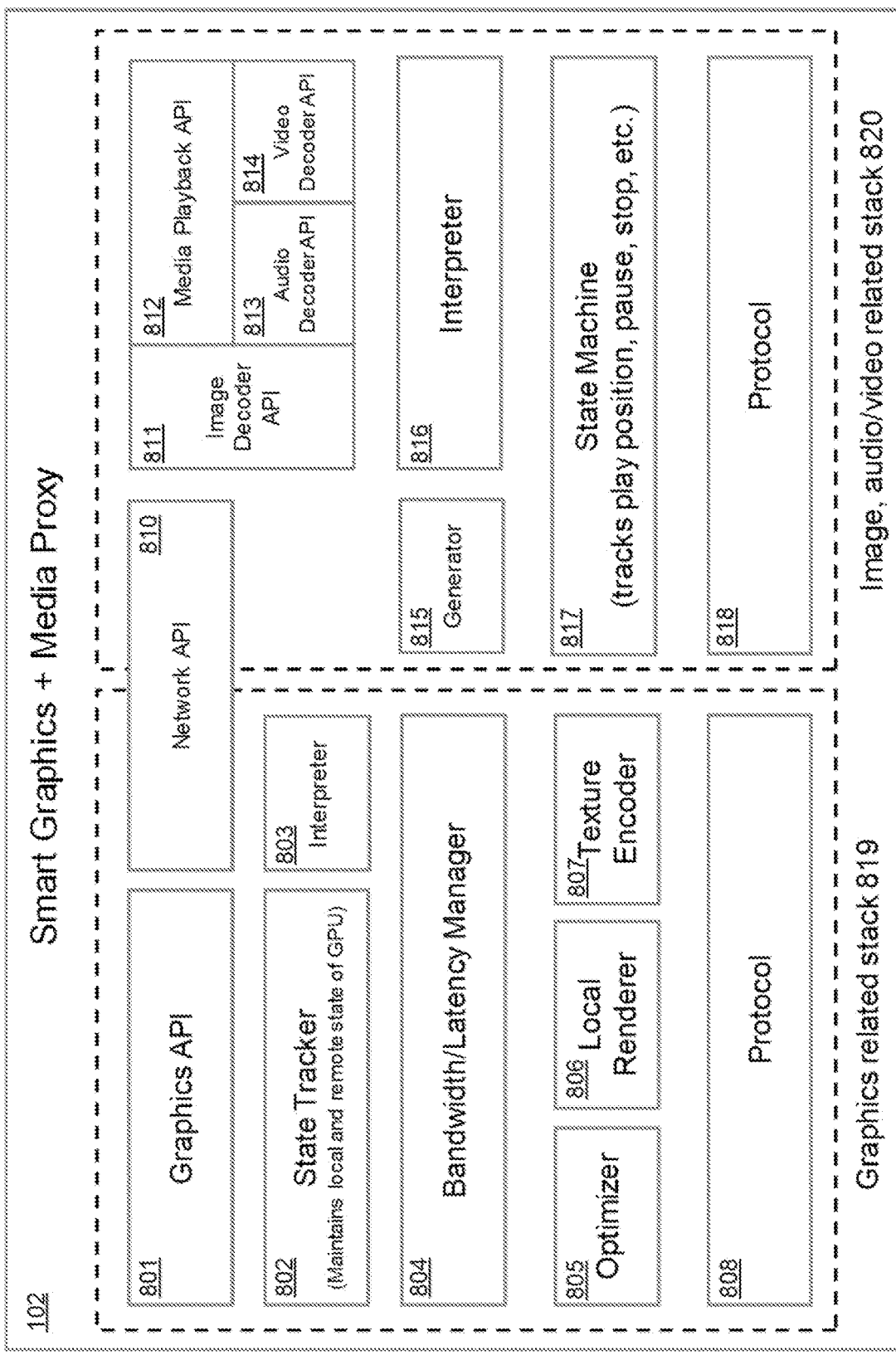
FIG. 8 is a block diagram of a smart-graphics-&-media-proxy (SGMP) component, in accordance with some embodiments.

FIG. 8 is a block diagram of an SGMP component (e.g., SGMP 102), in accordance with some embodiments. SGMP 102 includes graphics related stack 819, interpreter 803, bandwidth/latency manager 804, optimizer 805, local renderer 806, texture encoder 807, and/or protocol module 808; and the media (e.g., image, audio, and/or video) related stack 820 with modules including image decoder API 811, media playback API 812, audio decoder API 813, video decoder API 814, generator 815, interpreter 816, state machine 817 (e.g., to track play position, pause, stop, etc.), and/or protocol module 810. Network API 810 facilitates communication between components of SGMP 102 and remote devices (e.g., client device 130). FIG. 8 can be further understood with regard to descriptions below of operations indicated in FIGS. 13-18.

In some embodiments, Graphics API module 801 implements a graphics API (e.g., OpenGL (for example, Open GL ES 2) and/or DirectB). Graphics API module 801 implements functions specific to the API, such as: API function definitions, non-state-dependent error checking, non-state-dependent queries, system integration functions, and/or system queries.

Figure 13:
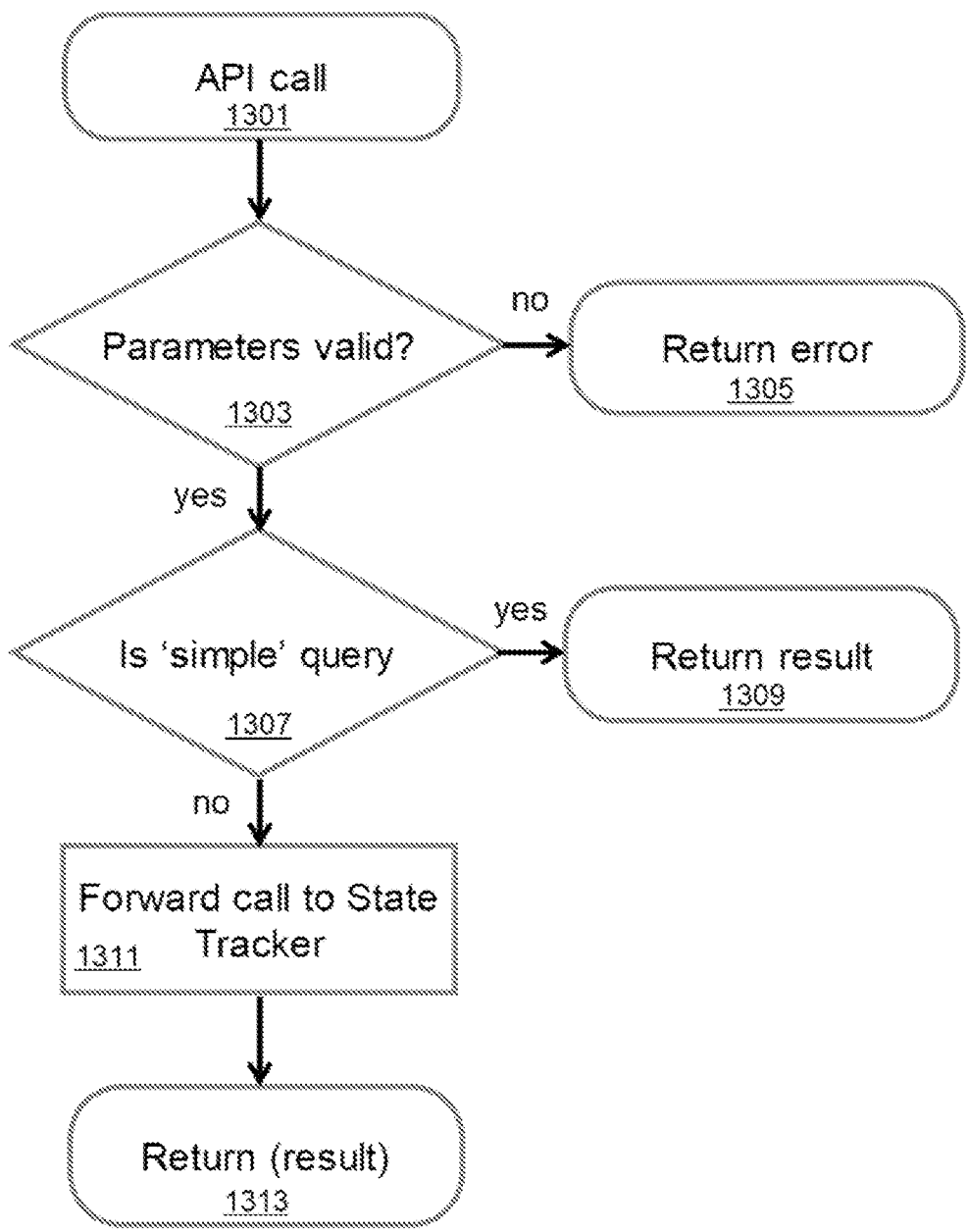
FIG. 13 is a flowchart illustrating operation of a graphics API module, in accordance with some embodiments.

FIG. 13 is a flowchart illustrating operation of a graphics API module 810, in accordance with some embodiments. Third-party application 101 initiates an API call in operation 1301. The call may have associated parameters. The validity of the parameters with respect to non-state-dependent constraints (such as, but not limited to, parameter range, enumeration validity, pointer validity, inter-dependent parameter validity, etc.) is checked in operation 1303. In accordance with a determination that the parameters are not valid, graphics API module 810 returns an error in operation 1305. In accordance with a determination that the parameters are valid, the process proceeds to operation 1307. APIs typically support several types of calls. One of such type of calls are query calls. These can be simple, non-state-dependent or depend on some underlying state. Simple calls (as determined at operation 1307), for example a query for the libraries version number, are handled in operation 1309 by returning a result. More complex, state-dependent query calls and non-query calls are forwarded to the state tracker 802 in operation 1311. The API call is terminated in operation 1313 by returning a result or simply returning.

In some embodiments, state tracker module 802 processes function calls passed on from the graphics API module 801 and maintains a state model of the display state of the remote application 101 which is providing service to a client 130 in domain 3. The state tracker module also maintains a model of the display state of the client. By way of example, for certain events when a call would cause changes to the client's frame buffer 1940 that would be seen by a user, a difference between the virtual state and the state of the real (remote) GPU 1940, maintained by the state tracker 802, is determined and forwarded as an update to the bandwidth manager 804.

Another purpose of the state tracker 802 is as a first filter to prune superfluous API calls. It is well known to the skilled person that graphics APIs (such as OpenGL) may be stateful APIs, meaning that a series of calls is required to perform certain functions. Subsequent calls are inter-dependent. Applications typically implement some form of state management that usually generates a considerable amount of superfluous calls to set a state or return to a known state before setting the next state. By keeping a model of that state in 802, a canonical state change can be generated once a function is actually performed. This not only is a reduction in the amount of state changes (hence data), it also simplifies the implementation of the other modules of the graphics related stack 819 of the SGMP. The maintenance of the state of the idealized GPU, as kept by 802, plays a key role in mitigating the high-latency properties of the link. By maintaining this complete model of the state locally in 802, any query with respect to that state can be satisfied locally and hence avoid a situation where the actual (remote) GPU needs to be queried with the attendant latency penalty.

Figure 14:
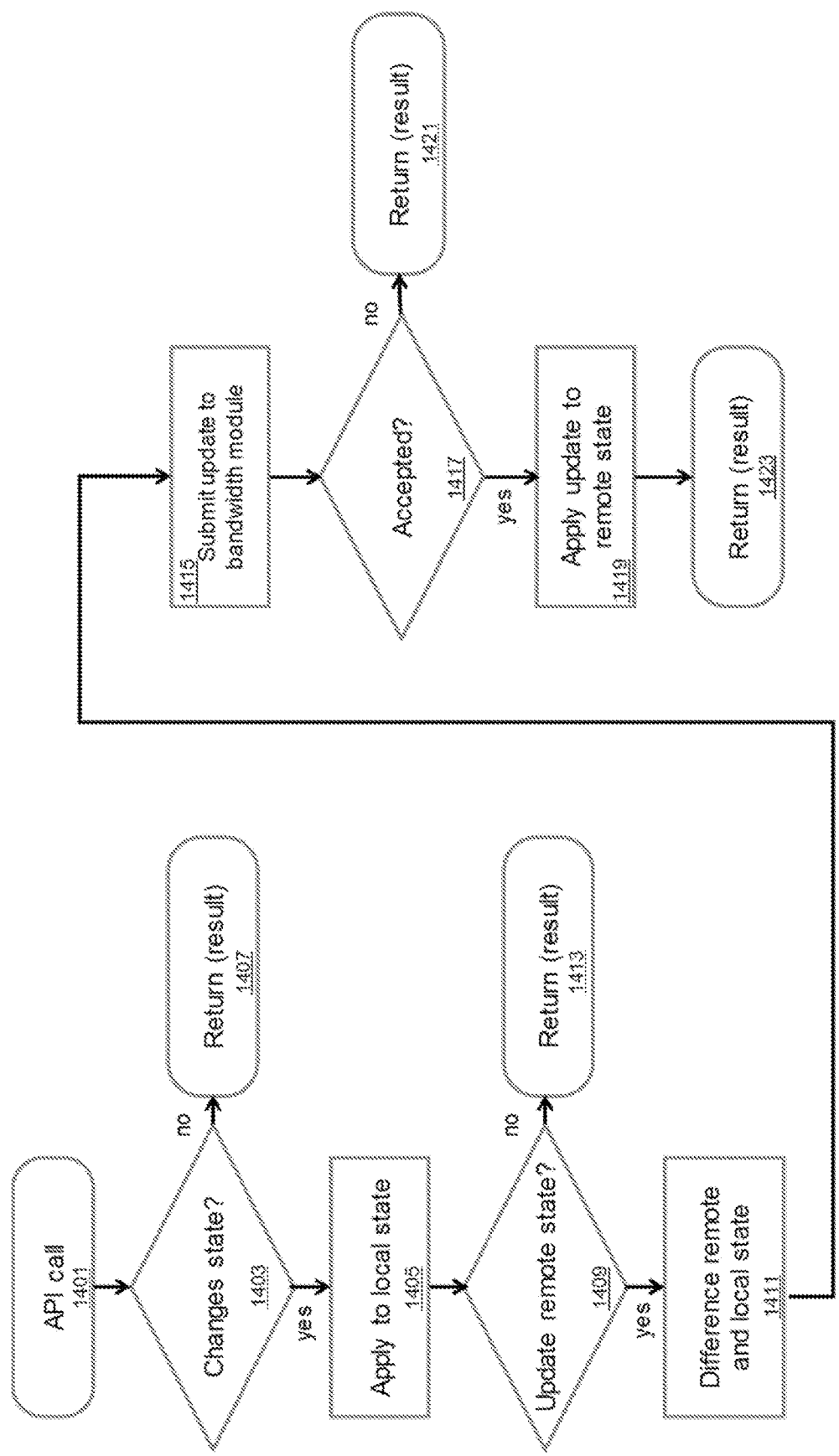
FIG. 14 is a flowchart illustrating operation of a state tracker module, in accordance with some embodiments.

FIG. 14 is a flowchart illustrating the operation of state tracker 802 for handling a stateful API call forwarded from the API module 801, starting with 1401. It is first determined if the call causes a state change 1403. If it is not, the result is returned 1407. If the API call causes the state to change, the call is applied to the virtual state 1405. In operation 1409, it is determined whether the remote client-side state needs to be updated. The following lists reasons why the remote state may need to be updated: (1) the API call causes changes to the client's frame buffer 1940 that are user-perceivable, (2) the API call has related data that can be send ahead, (3) a state accumulation threshold has been met, (4) a timeout has expired.

If the remote, client-side state is not to be updated, the state tracker returns from the API call with an optional result (1413). If the remote state is to be updated, operation 1411 determines a difference between the remote state and local state. This difference, or update, can be as simple as a list of all the accumulated API calls that have not yet been forwarded to the client, or it could be a more abstract description of state changes. The update to the remote state is submitted to the bandwidth module 804 in operation 1415. The bandwidth module may accept or reject the update 1417. If the update is rejected, the update is discarded, the state difference between the virtual and remote state accumulates and the result of the call is returned 1421 in the same way as in operation 1413. If the update is accepted by the bandwidth module 804, the update is applied in operation 1419 to the state tracker's remote state, making it the same as the virtual state and the result of the call is returned 1423, similar to operation 1413 and 1421.

Note that it is envisioned that, instead of accepting or rejecting the complete update, the bandwidth module 804 may accept a partial update and operation 1419 only applies the accepted part of the update to the state tracker's remote state.

In some embodiments, bandwidth/latency manager 804 module keeps track of the available bandwidth and incurred latency. If the update fits the available bandwidth and latency profile, the update is passed on to the optimizer 805 and texture encoder 806, along with parameters that allow these modules to rework the intended update to the client device 130 to fit the available bandwidth and/or latency requirements. If the update does not fit the bandwidth/latency profile, the update may be rejected, and the state tracker's 802 virtual state difference will accumulate the missed updates and frames which then may be skipped in order to resynchronize the remote application 101 with the client 130.

Figure 15:
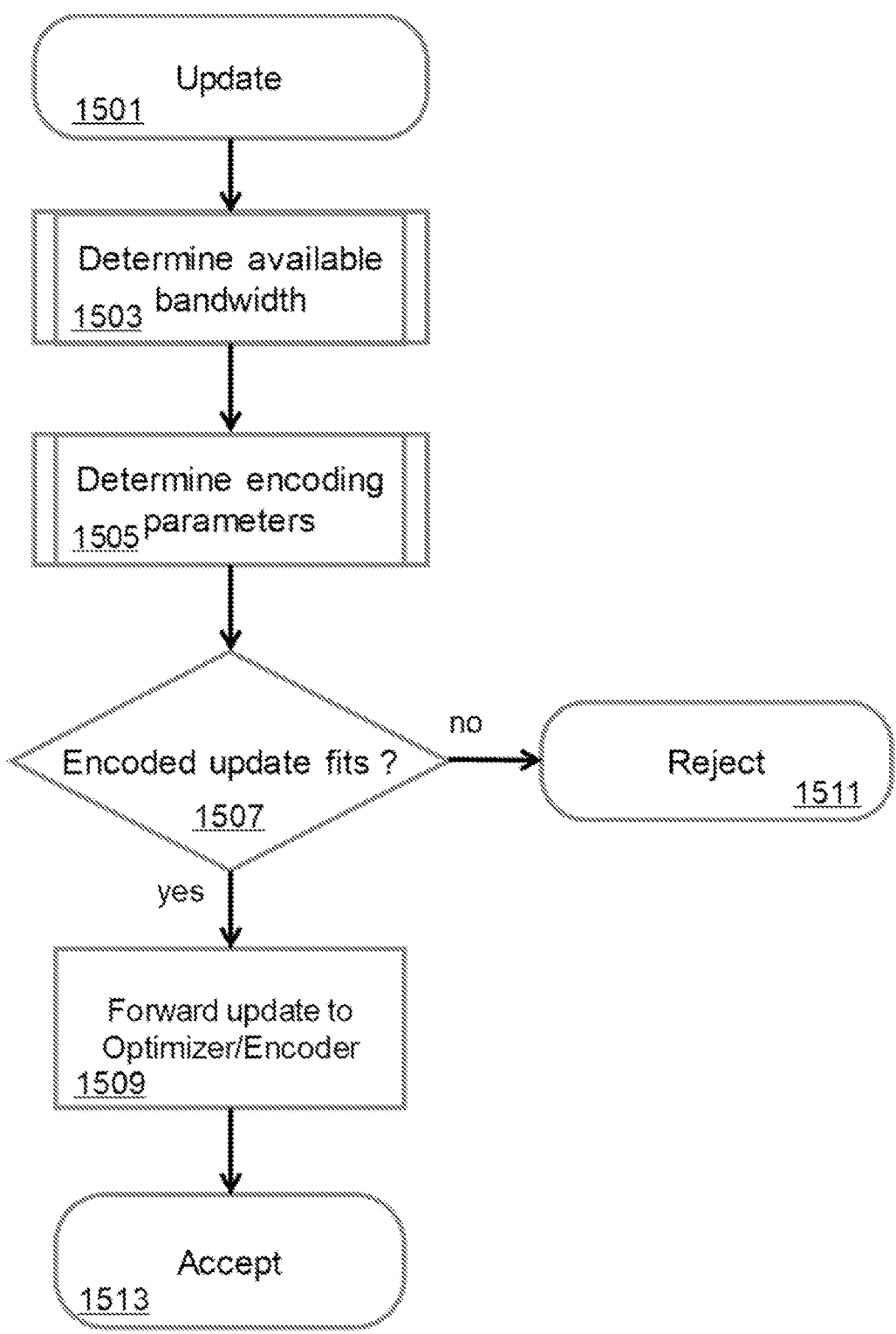
FIG. 15 is a flowchart illustrating operation of a bandwidth/latency manager module 804, in accordance with some embodiments.

FIG. 15 is a flowchart illustrating operation of the bandwidth/latency manager module 804, in accordance with some embodiments. In operation 1501 the module gets an update from the state tracker 802 module. Operation 1503 applies heuristics to determine the bandwidth available for the update. With an allotted amount of bandwidth, operation 1505 applies another set of heuristics to determine a set of encoding parameters and predicts whether the update would fit the available bandwidth 1507. If it does not, the update is rejected 1511 and returned to the state tracker 802. If the update is assumed to fit the allotted bandwidth, the update is forwarded to the optimizer 805 and encoder 807 modules in operation 1509, and the process is terminated by signaling back to the state tracker 802 that the update has been accepted 1513.

Note that the various applied heuristics may weigh various considerations. When an update does not fit the available bandwidth, the bandwidth/latency manager can: (1) accept the update and the temporarily increased latency, (2) accept the update and specify a set of encoding parameters or optimization methods that decreases the size of the update at the expense of visual quality, (3) reject the update and increase latency or have the state tracker drop the update if possible.

In some embodiments, optimizer module 805 processes the updates of state difference between the virtual (idealized) state and the real state in the client, and determines what transformations can be made to reduce the size of the update by, for example only and without limitation, reordering operations within the remote application to minimize state changes, leveraging additional client extensions not used by the application, performing operations locally and generating intermediate textures instead of sending all textures (components of a graphic scene) to the client 130 and combining them there or, postponing operations in case of bandwidth shortage.

The optimizer 805 may determine that performing operations locally and generating intermediate textures within the graphics related stack 819 may be more optimal than sending all textures to the client 130 and perform these operations client-side. A self-contained chunk from the update from the optimizer 805 module is used to produce a texture that is equivalent to a texture that would have been generated on the client 130 had the individual textures and chunk from the update been sent to the client. Instead of sending the textures and chunk to generate the texture client-side, the generated texture is sent.

Figure 16:
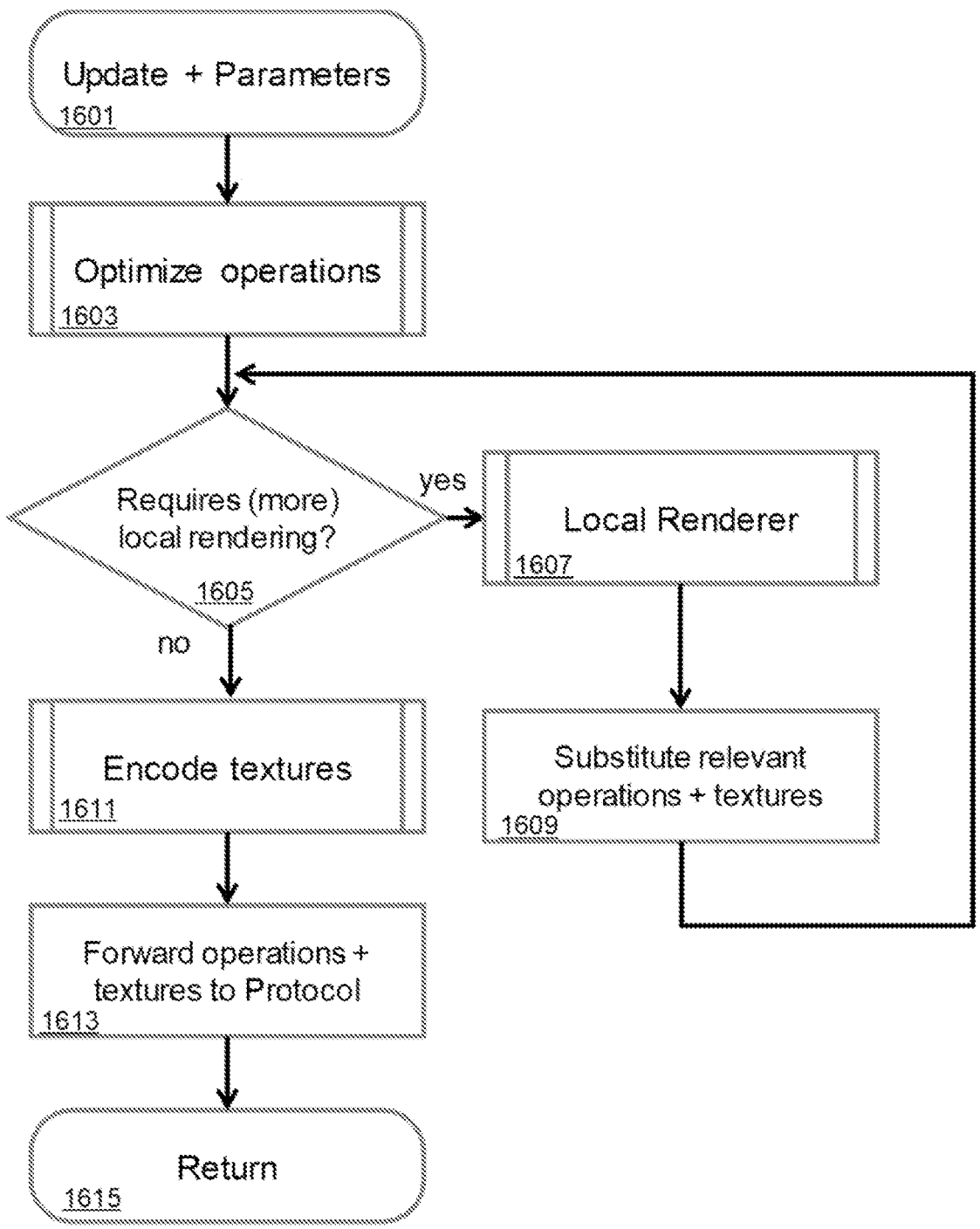
FIG. 16 is a flowchart illustrating operation of an optimizer module, in accordance with some embodiments.

FIG. 16 is a flowchart illustrating operation of the optimizer module 805, in accordance with some embodiments. In operation 1601, the optimizer module 805 is updated with parameters from the bandwidth/latency manager 804 module. Operation 1603 applies various heuristics to the update (e.g., to reduce, simplify and/or adapt the update to the client's capabilities). Operation 1603 includes, for example, (1) reordering operations to minimize state changes, (2) leveraging additional client extensions not used by the application, (3) determining which operations can be performed locally by generating intermediate textures instead of sending all textures to the client and combine them there, and/or (4) postponing operations in case of bandwidth shortage.

If local rendering is required, operations 1605, 1607 and 1609 implement this local rendering in 806. Operation 1607 applies the local rendering operation for a subset of the operations and textures in the update. Operation 1609 subsequently substitutes the subset of operations and textures with a new set of operations and textures that is either smaller in size or compliant with the client's capabilities. After the local rendering operation, textures are encoded in operation 1611. Once all operations have been processed and textures have been encoded, the transformed update is forwarded to the Protocol module in operation 1613 and the flowchart terminates in 1615 by returning control to the bandwidth module 804.

In some embodiments, local renderer module 806 may be used to generate a local representation of a frame-buffer if texture read back is required or if vertex transform feedback is used. Occasionally, applications read back rendered texture material. Although this is very uncommon because it is also an inefficient operation when the GPU is not virtualized. For determining which textures are located within the display area, the Optimizer module 805 may use the Local Renderer 806 to run vertex shaders.

In some embodiments, texture encoder 807 works in conjunction with the optimizer module 805 to transform the state update to fit the bandwidth/latency profile as specified by the bandwidth manager. In some embodiments, optimizer module 805 performs functions such as: (1) encoding texture pixels to encoded images to reduce the amount of data that needs to be transmitted to the client; (2) texture scaling to further reduce the amount of data; and/or (3) caching of already encoded texture.

Graphics APIs often handle raw and/or lightly compressed texture material. In some embodiments, to reduce the amount of data that needs to be transmitted to the client, the material is (re)compressed to allow for transmission over low-bandwidth links. In some embodiments, when a texture has an alpha channel, the texture is compressed with an image codec that supports an alpha channel (e.g., the portable-network-graphics (PNG) format). In some embodiments (e.g., when a texture is a natural image) a lossy compression algorithm, such as the joint-photographic-experts-group (JPEG) image format, is used (e.g., to reduce the bandwidth required to transfer the image without a user-perceivable loss in quality). In some embodiments, computer-generated images (such as for example material representing text, gradients, etc.) are stored using an image format such as PNG. The Texture Encode module 807 processes the texture material and determines a codec to apply.

When a lossy codec is selected by the texture encode module 807, the texture encoder 807 module must determine what level of quantization (reduction in quality or loss in fidelity) is required to meet the bandwidth profile, while minimizing the degradation of fidelity as much as possible. An image format such as WebP that can be used to encode textures both lossless or lossy would serve both lossy and lossless scenarios. The decision can be augmented by information from the optimizer 805 about the texture's role.

Applications may not always provide optimal texture sizes. For example, it is not uncommon to use a texture that is larger than it will appear on screen. Rescaling the texture to an appropriate size may not only reduce the bandwidth required to transfer the texture material, it may also improve fidelity because more advanced scaling filters can be applied server-side than may be available client-side.

The texture encoder 807 module uses a cache of encoded textures. If texture material has been encoded before, it may be available from the cache. This significantly increases scalability. Texture analysis and compression are CPU intensive operations. If the analysis and compression can be avoided (by hashing the texture material and metadata and checking whether an encoded version is available in the cache), a significant scalability advantage can be achieved. Note that this cache may be shared between other instances of the texture encoder 807 to further increase cache efficiency.

Figure 17:
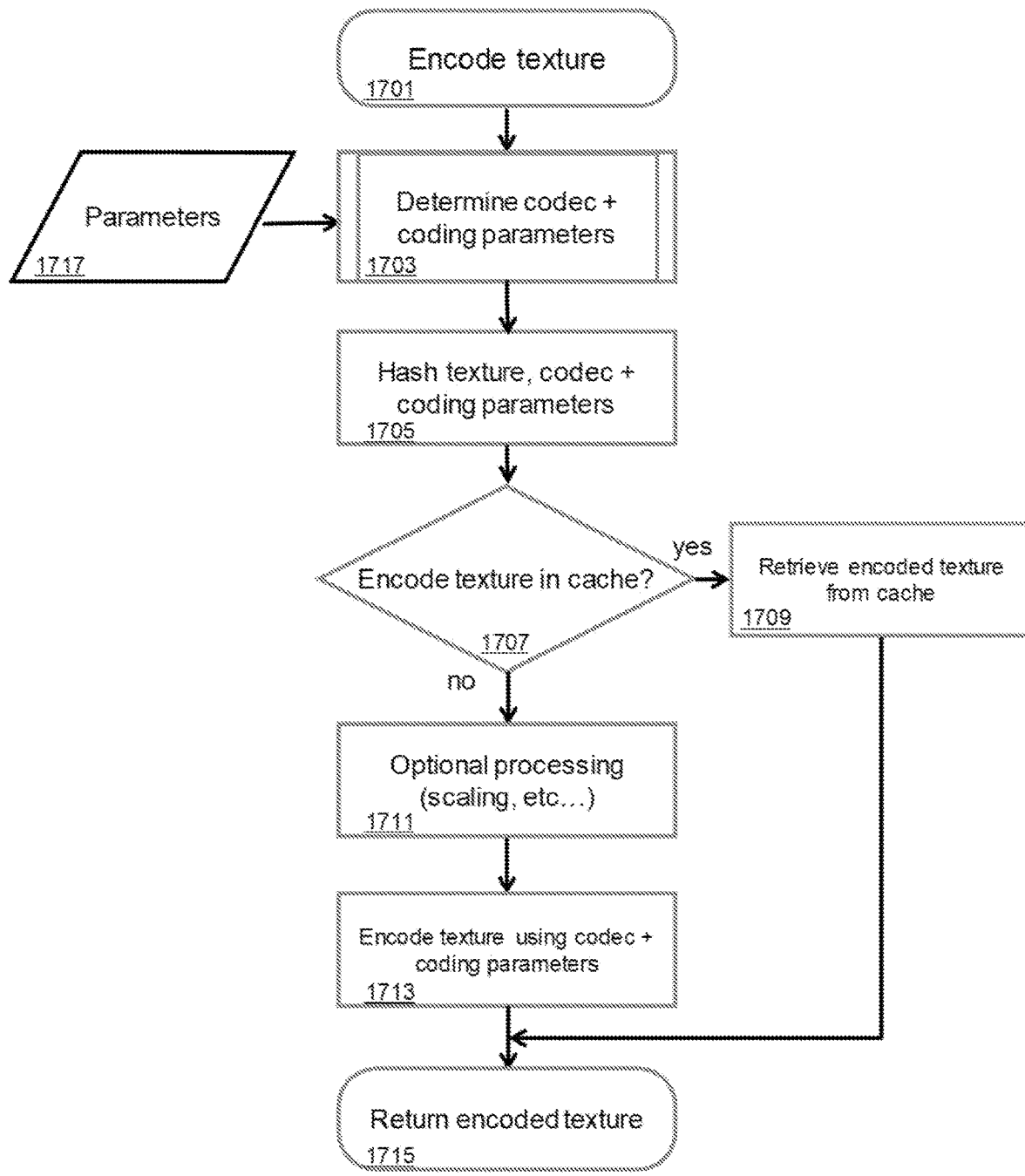
FIG. 17 is a flowchart illustrating operation of a texture encoder module, in accordance with some embodiments.

FIG. 17 is a flowchart illustrating operation of the texture encoder module 807, in accordance with some embodiments. At operation 1701, a texture to encode from the optimizer module 805 is obtained. Based on parameters 1717 from the bandwidth/latency manager module 804, augmented by the optimizer module 805, heuristics determine the image format for the texture encoding along with a set of coding parameters 1703. Operation 1705 hashes the texture data along with codec and coding parameters. The hash is used to lookup whether an encoded version of that constellation is already available in cache 1707. If it is available, the encoded version is retrieved from the cache 1709 and returned 1715. If it is not available in the cache, the texture data undergo several types of processing (such as for example scaling) in operation 1711, after which the texture data is encoded 1713 according to the image format and encoding parameters determined in operation 1703 and stored in the cache. The encoded version is subsequently returned in operation 1715.

In some embodiments, protocol module 808 implements the protocol that transforms the structured data from the optimizer 805 and texture encoder 807 modules into actual bytes, then compresses the data and sends it as protocol messages to the client 130. It also receives messages from the client, primarily during the connection setup to determine the client's capabilities.

Figure 18:
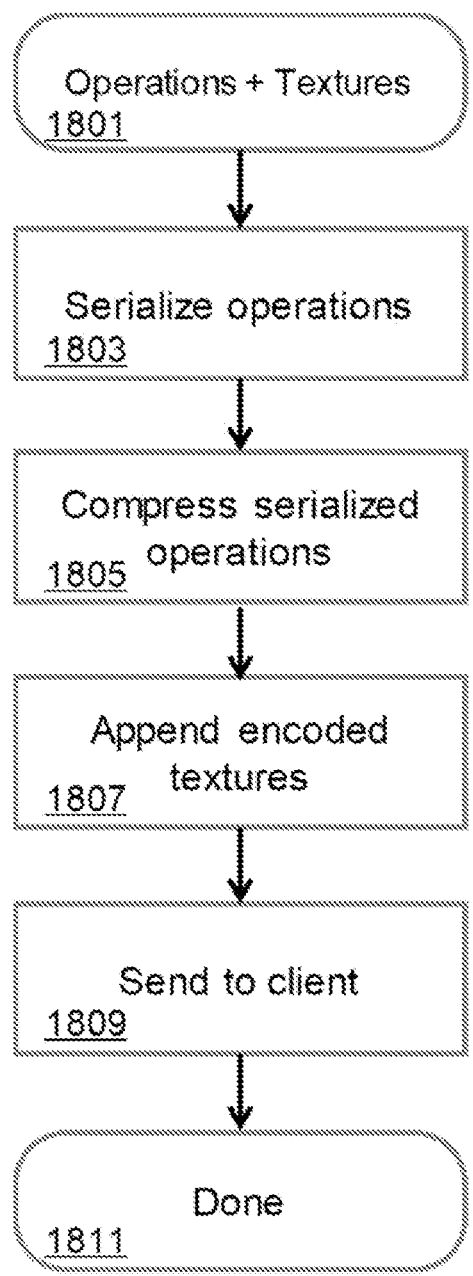
FIG. 18 is a flowchart illustrating operation of a protocol module, in accordance with some embodiments.

FIG. 18 is a flowchart illustrating operation of the protocol module 808, in accordance with some embodiments. In operation 1801, the module is updated with operations in textures. In operation 1803 the operations and textures are serialized in a binary format suitable for transmission over a network. The serialized data pertaining to the operations may be highly redundant, therefore operation 1805 applies an optional compression algorithm to that data. The compression history of the compression algorithm may span several updates and is not limited to a single update. The compression may be skipped for the data parts that constitute already-compressed textures. Operation 1807 appends the encoded textures to the compressed data. Operation 1809 sends the compressed data representing the operations and the appended texture data to the client 130. The process terminates in operation 1811.

Figure 9:
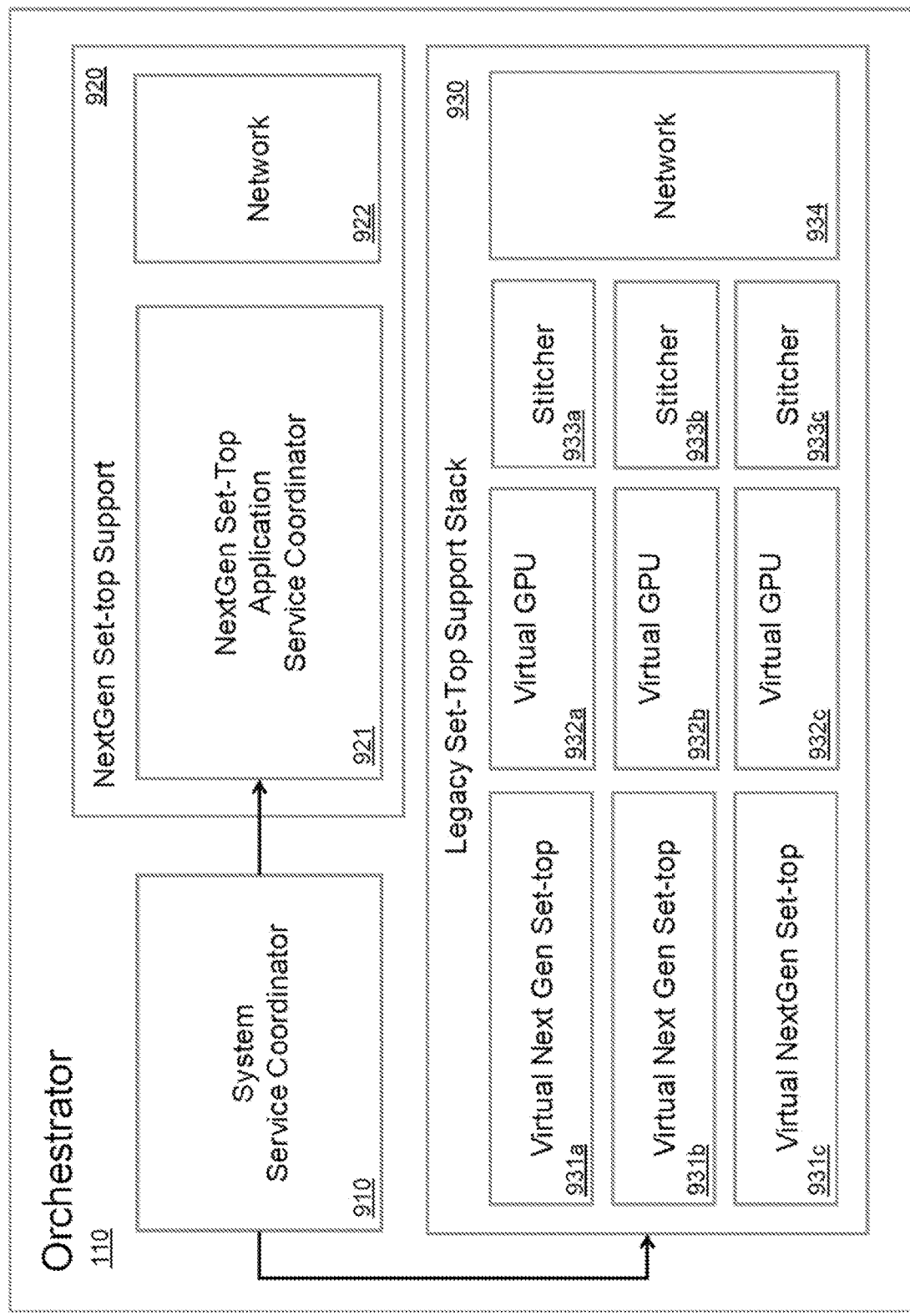
FIG. 9 is a diagram depicting elements of an orchestrator sub-system which provides central control of the content delivery system, in accordance with some embodiments.
Figure 19:
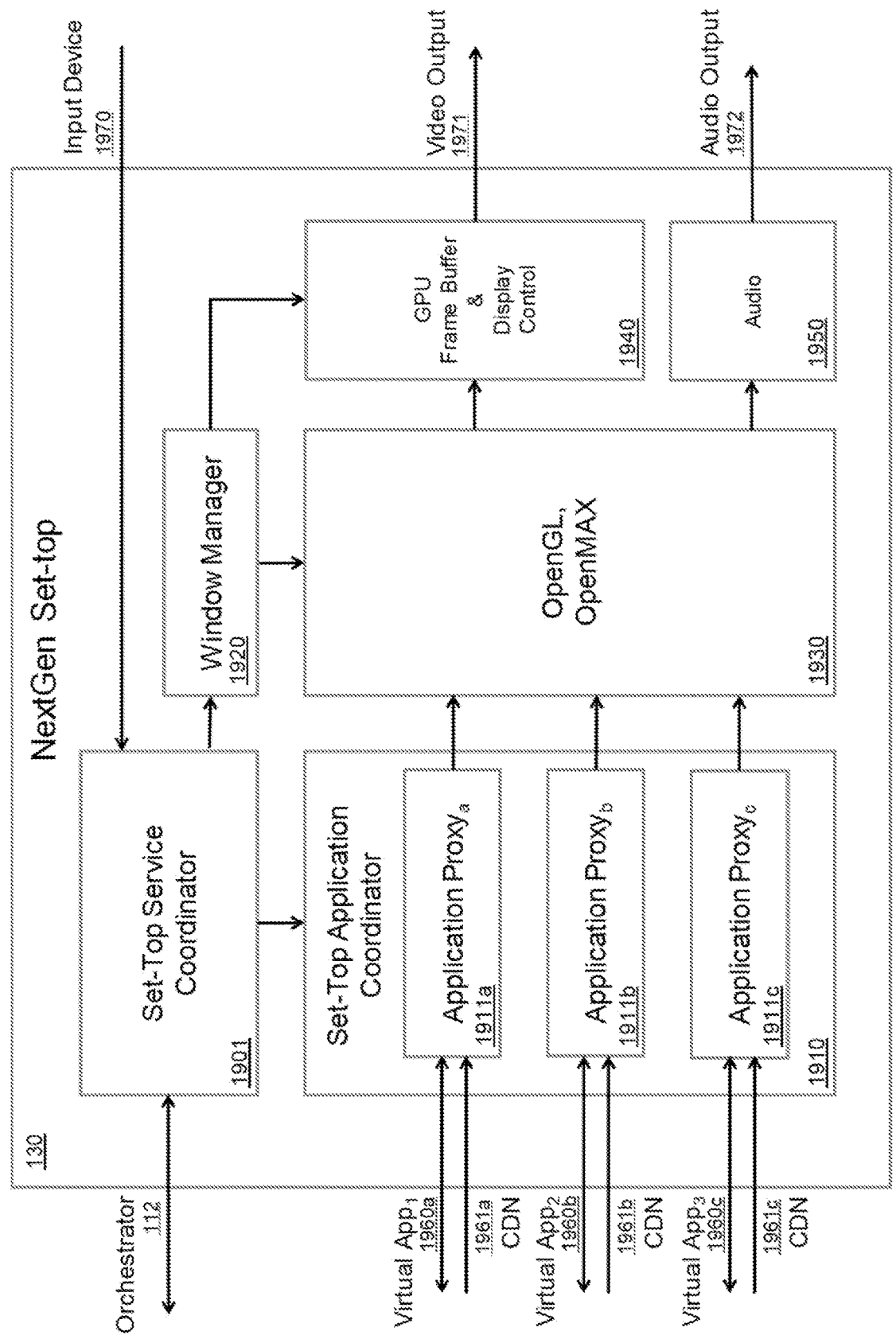
FIG. 19 is a block diagram of a client device which serves as a set-top box for video services of a multichannel video program distributor, in accordance with some embodiments.

FIG. 9 illustrates an embodiment in which orchestrator 110 is augmented by a legacy-set-top-support-stack 930 that hosts one or more virtual-next-generation-set-top (VNGST) 931 instances (e.g., instances 931a, 931b, and 931c) for each legacy client session. The VNGST has a similar composition to next-generation-set-top 130 as depicted in FIG. 19 (e.g., virtual-GPU 932 (VGPU) of VNGST 931 corresponds to the GPU, frame-buffer and display control component 1940 of next-generation-set-top 130; and VGPU 932 outputs an audio/video stream whereas next-generation-set-top 130 outputs video 1972 and audio 1973). In some embodiments, VGPU 932 (e.g., VGPU 932a, 932b, and 932c that correspond to VNGST 931a, 931b, and 931c, respectively) implements GPU and video encoding functionality in software, hardware or any hybrid of the two. In some embodiments, VGPU 932 uses brute-force encoding techniques to encode the individual-rendered video frames into a compliant video elementary stream or may use fragment-based encoding techniques, as known in the art, where the fragments are combined into a video elementary stream by means of a stitcher 933 (e.g., stitcher 933a, 933b, and 933c that correspond to VNGST 931a, 931b, and 931c, respectively). Video elementary stream and audio is subsequently multiplexed and streamed to the legacy client via a network 934 connection. Ancillary functionality in the VNGST, such as the input device 1970 or connection to the orchestrator, are appropriately replaced by up-stream key events, as known in the art, and a localized connection 112 to the orchestrator.

Figure 10:
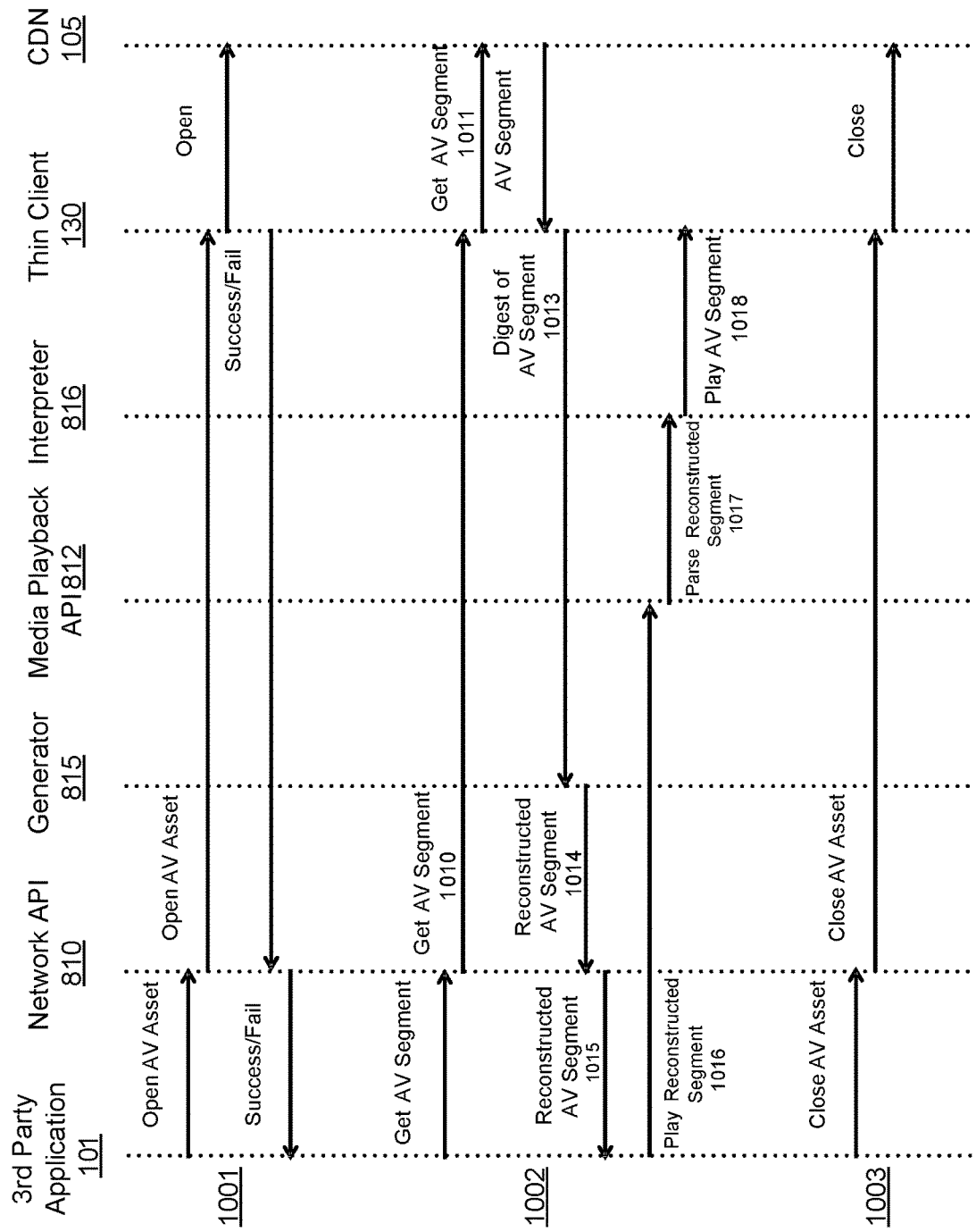
FIG. 10 is a state-flow diagram illustrating control and data flow for media content in the system between a third-party application, the SGMP sub-system, and a client device, in accordance with some embodiments.

FIG. 10 is a state-flow diagram illustrating control and data flow for media content in the system between a third-party application 101, SGMP sub-system 102, and a client device 130, in accordance with some embodiments. FIG. 10 depicts an event diagram of the operation of the disclosed system with respect to media playback and represents an exemplary instance of operation on a video stream. In some embodiments, application 101 as indicated in FIG. 10 is of the type that uses a higher-level media playback API 812, however, the system is also applied for applications that directly use an audio decoder API 813 or video decoder API 814. The events of FIG. 10 are detailed below.

Operations shown in the region indicated by 1001 pertain to a third-party application (e.g., application 101) that intends to start playback of a media asset that is authorized (e.g., by third-party backend 104) for streaming to client 130. To do so, application 101 first opens the resource on the CDN, or issues a progressive download command, through the network API 810. Next, the network API issues an open-resource command to the client 130. The client 130 then opens the actual resource on the CDN 105 and returns a success/fail status to the network API 810. The success/fail status is passed on to the third-party application 101.

Operations shown in the region indicated by 1002 include, after successfully opening the resource, the third-party application 101 requests segments from the network API 810 which passes these requests on to the client 130. The client gets 1011 the segments from the CDN 105. Upon complete retrieval of the segment from the CDN, the client signals 1013 back to the generator module 815 that it got the segment, along with a digest of the segment. An example of the generation of a digest out of a typical segment is given in FIG. 11. Original Segment 1101 depicts a hypothetical segment, such as, by way of example only, an ISO base-media file-format (BMFF) segment as used in MPEG-dynamic-adaptive-streaming over HTTP (MPEG-DASH). Such a segment consists of a segment header 1102 (e.g., which also corresponds to segment headers 1110 and 1112) and several frames, in this example, 1103 to 1108. It should be appreciated that the bulk of the segment data typically is the DRM-protected frame data. In some embodiments, the digest of the segment 1109 is formed by removing the DRM-protected frame data and only including in the digest 1109 the unmodified segment header (e.g., segment header 1110 corresponds to unmodified segment header 1102) and/or frame headers (such as picture headers and slice headers), including any codec specific headers, such as for example sequence headers, that are required to make an accurate reconstruction of the sequence of frames by the generator 815.

From the digest, the generator module 815 reconstructs the AV segment and sends, at 1014, the reconstructed segment to the Network API 810. Depending on a type of application, the segment may be recreated to various degrees of accuracy. For example, the frames are reconstructed using random or pseudorandom data. In some embodiments, the segment is accurately reconstructed segment with elementary streams. For example, elementary streams may be available at the generator module 815 (e.g., from another source than the original segment) and the reconstructed segment can include these available elementary streams. The reconstructed segment is passed at operation 1015, from the generator 815 through the network API 810, back to the third-party application 101. After various transformations (such as copying between buffers, in the process concatenating or fragmenting one or more segments), the third-party application passes 1016 the transformed segment(s) to the media playback API 812. The media playback API passes 1017 the segment(s) to an interpreter module 816. The interpreter module uses the reconstructed segment data to map segment(s) to segment(s) stored by the client. The interpreter module 816 instructs the client to play 1018 the respective stored segments.

Operations shown in the region indicated by 1003 include closing the media asset by the third-party application 101 on the CDN 105. The skilled reader appreciates that for a stateless protocol such as for example HTTP, the open operation of the flowchart may represent the retrieval of metadata about the audio/video asset, such as for example the asset's MPEG-DASH manifest and that the asset is implicitly closed.

Figure 11:
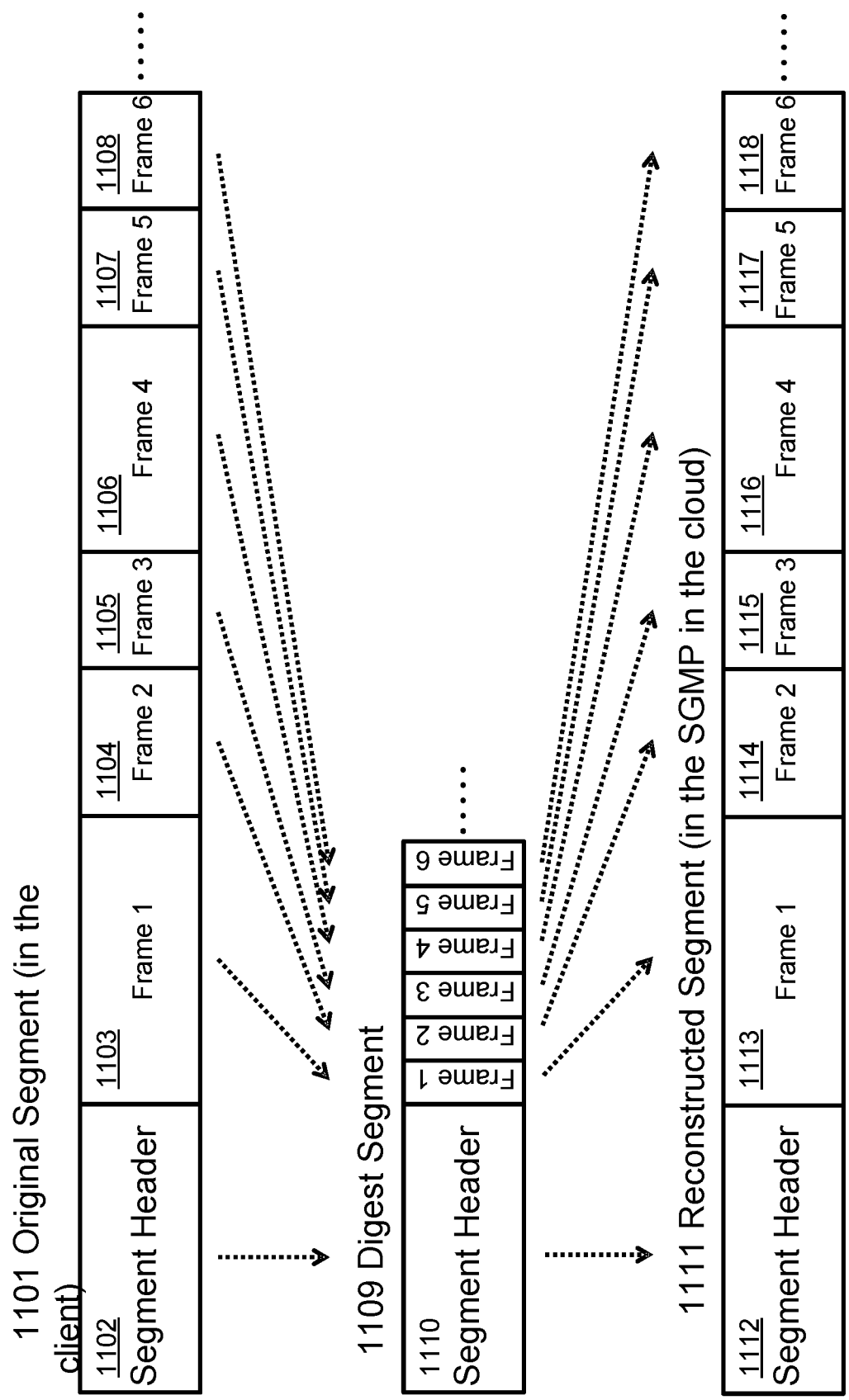
FIG. 11 is a diagram that illustrates the transformation of a video segment into a digest and its reconstruction into a reconstructed segment, in accordance with some embodiments.

FIG. 11 is a diagram that illustrates transformation of a video segment into a digest and reconstruction of the digest into a reconstructed segment, in accordance with some embodiments. As described above with reference to FIG. 10, the client gets (operation 1011) the segments from the CDN 105. The segment received at the client is represented as Original Segment 1101, with a first data size. Segment 1101 includes a segment header 1102 and a plurality of frames, including frames 1103-1108. The client device (e.g., client 130) generates a digest segment 1109. In some embodiments, the digest segment includes segment header 1110 and a representation of the plurality of frames corresponding to the original segment frames. In some embodiments, the digest segment has a second data size, smaller than the first data size. In some embodiments, the segment header 1110 is the same (e.g., unmodified) as original segment header 1102. The VCVM 103 receives the digest segment 1109, including the segment header 1110 and the representation of the plurality of frames, and reconstructs the segment into reconstructed segment 1111. The reconstructed segment 1111 includes segment header 1112 (e.g., corresponding to segment header 1110) and a plurality of frames 1113-1118. In some embodiments, the reconstructed segment has a third data size that is equivalent to the first data size.

FIG. 12 is a state-flow diagram illustrating control and data flow for image assets in the system between a third-party application 101, the SGMP sub-system 102, and a client device 130, in accordance with some embodiments.

An event diagram of the operation of the disclosed system with respect to the retrieval and decoding of image assets by the client. It is very similar to the retrieval of video segments, however, where media such as audio and/or video requires a continuous (e.g., segment-by-segment) process of repetition of operation 1002, image assets typically involve a single invocation of operation 1202.

FIGS. 10, 11 and 12 illustrate how separation of control and data is achieved, in accordance with some embodiments. The application 101 uses APIs, such as the network API 810, media playback API 812, image decoder API 811 and graphics API 801 to control the retrieval and processing of graphics, audio and video data. In some embodiments, instead of operating on the actual data of the assets from the CDN 105, the control is transferred (remoted) to the client 130 and the client retrieves and processes the data on behalf of the application in its own domain, thus leveraging its geographical favorable position relative to the CDN 105 to do so. Since standardized APIs used by application 101 typically require actual data to be passed as argument or returned as result, there is a need to have equivalent data (e.g., an equivalent number and/or size of segments and/or frames of video data) available for the application 101 to process so that the application can perform its control responsibility. In this way, the application need not be modified to operate within the systems described herein. For example, video data is typically DRM protected and only a protected part of the media playback stack processes this data during the decode process of the video data. Since this processing and decoding functionality is typically not a function of the application itself, it can be performed by the client on behalf of the application. The client 130 provides the application with a representation of the original data, such as a digest (e.g., digest 1109) of the original data (e.g., having a size that is smaller than the original data). In some embodiments, the digest only contains that part of the data that is required for the application to fulfill its role. In this manner, the bandwidth consumption of data flowing from client 130 to application 101 is substantially less than the bandwidth consumption of data flowing from the CDN 105 to the client 130.

As described with regard to FIG. 9, orchestrator 110 is the command and control center. In some embodiments, orchestrator 110 coordinates a request for service from a client device 130 with one or more third-party applications 103*a*, 103*b*, 103*c*, etc. . . . . In some embodiments, orchestrator 110 provides NextGen Set-top Support 920, which includes an application-service-coordinator 921 and a network interface 922. The application-service-coordinator 921 links a requesting client 130 with one or more available remote applications via network interface 922. If a legacy set-top 430 (e.g., a client device without a GPU) is the service requestor, then system-service-coordinator 910 may command 921 to remain in communications means with one or more remote applications 103*a*, 103*b*, 103*c*, etc., and interface with an instance of a virtual-next-generation-set-top 931 local to the orchestrator that substitutes the functionality normally available on the next generation client and provide a composite output of the one or more applications and/or video from their respective CDNs 105 to client 430, by means of a VGPU 932 and optionally a stitcher instance 933, to produce a single stream output through network interface 934 that can be displayed by a legacy set-top 430.

FIG. 19 is a block diagram illustrating modules of a client device which serves as a set-top box for video services of a multichannel video program distributor, in accordance with some embodiments. The set-top-service-coordinator 1901 interacts with orchestrator 110 to control set-top-application-coordinator 1910 (STAC), window-manager 1920 and distribute input events from an input device 1970 (e.g., an input device (e.g., control button, keyboard, mouse, and/or touch screen) of client device 130 or a portable device (e.g., a remote control device) associated with client device 130) to the appropriate application proxy instance. The application proxy instances are managed by the STAC so that an instance of an application proxy is available for each third-party application currently active for the client's session. The application proxy receives events, such as graphics, primitives, and media events (e.g., as outlined in FIGS. 10 and 12) from the SGMP 1960 The application proxy receives image, audio and video data from CDNs 1961. Based on received data, the application proxy performs one or more operations on behalf of the SGMP. The graphics related primitives are forwarded to the local APIs, such as for example OpenGL and media events to OpenMAX. A local GPU 1940 renders the graphics primitives to a local context and under the control of the window manager 1920, the contexts are composited in the GPUs frame-buffer 1940 to be displayed via the device's video output 1971. Audio is output via an audio device 1950 to the audio output 1972.

Figure 20:
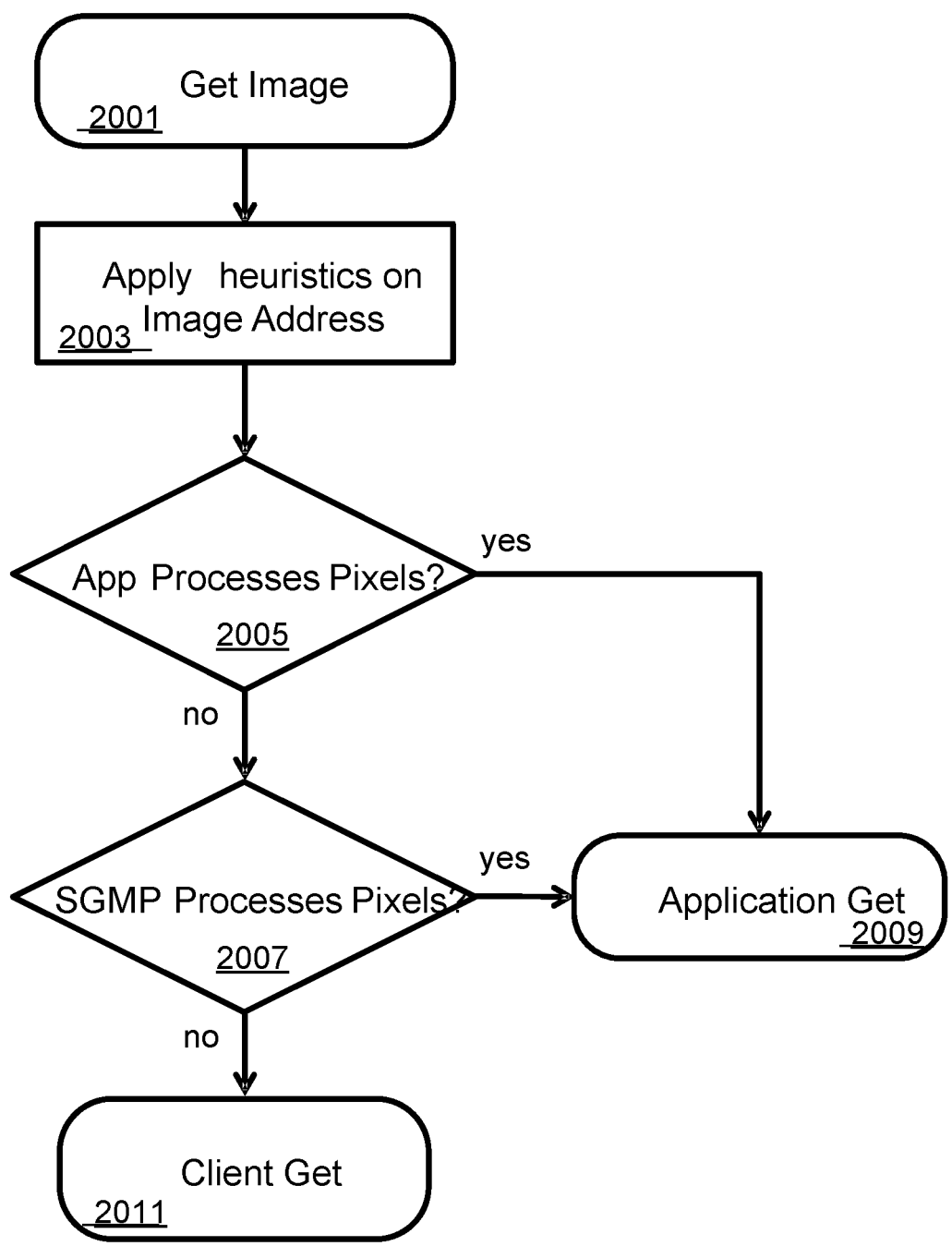
FIG. 20 is flowchart illustrating operations for performing an image get operation by an application or by a client-side application proxy, in accordance with some embodiments.

FIG. 20 is a flowchart illustrating operations for performing an image get operation by an application or by a client-side application proxy. In some embodiments, the decision to have the client get the image (e.g., or other media content) from the CDN (e.g., CDN 105) and pass back a digest to the application or have the application directly get the image from the CDN is under the control of the SGMP 102. For example, at operation 2001, the SGMP 102 gets the image (e.g., or other media content/asset) and applies (2003) heuristics on an image address associated with the image. The SGMP determines (2005) whether the application (e.g., Application 101 executing on VCVM 103) processes pixels. If so, the Application 101 gets, at operation 2009, the image from CDN 105 (e.g., the application directly gets the image assets via connection 107, FIG. 1). If the application does not process pixels (following "no" after operation 2005), it is determined 2007 if the SGMP 102 processes pixels of the image. If "yes", then the application 101 directly gets the image from CDN 105. If, however, the SGMP does not process pixels of the image, the client (e.g., client device 130) gets the image at operation 2011 and generates a digest segment of the image to transmit the digest segment to the VCVM 103, as described in further detail with reference to method 2100 (FIGS. 21A-21C).

Figure 21A:
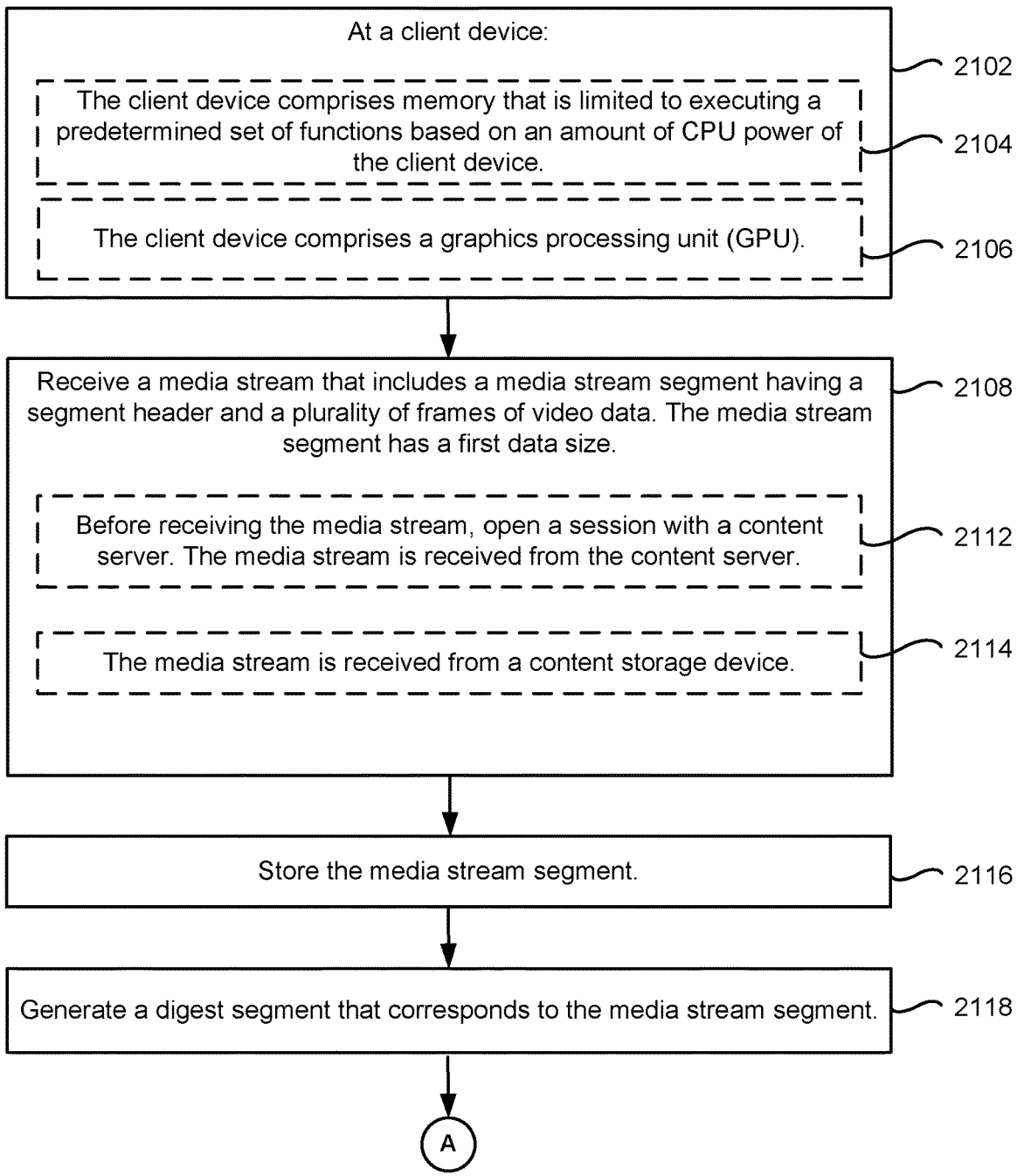
FIG. 21A-21C are flowcharts for a method of generating a digest segment at a client device, in accordance with some embodiments.
Figure 21B:
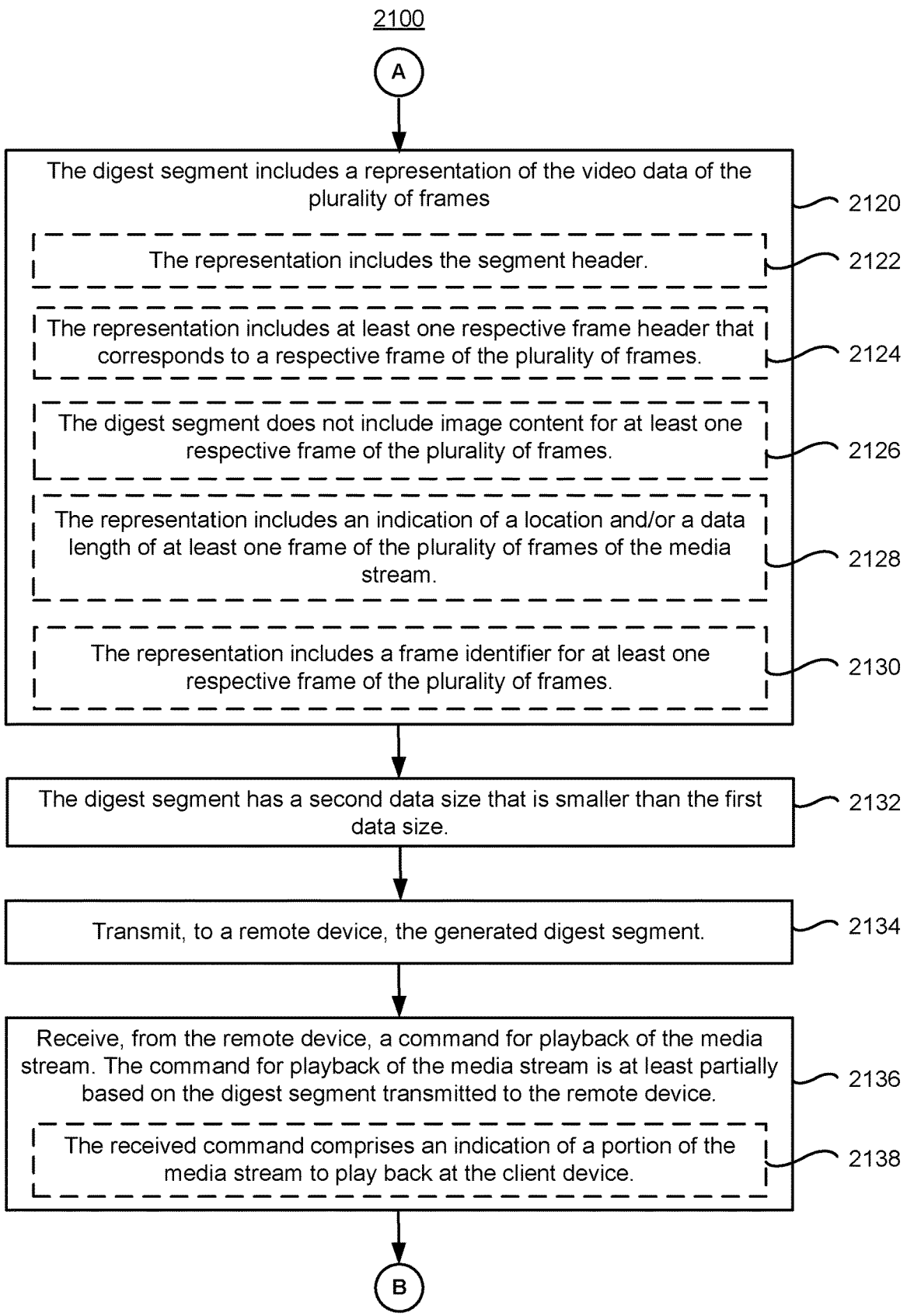
Figure 21C:
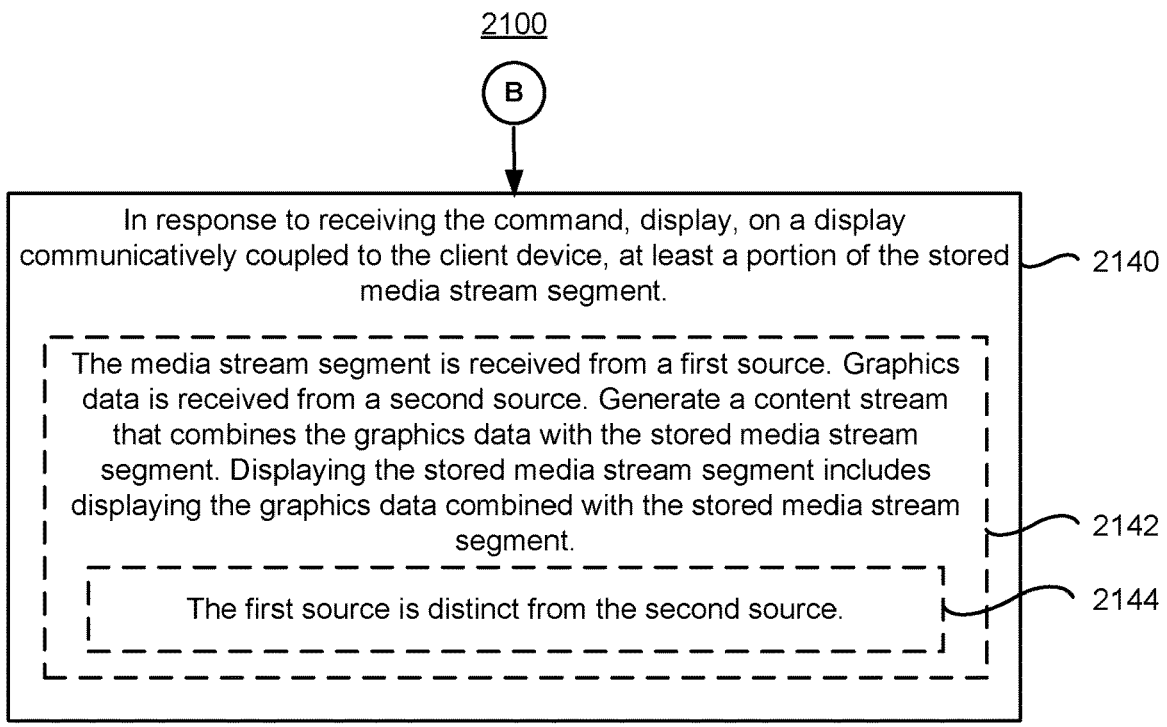

FIGS. 21A-21C illustrate a method 2100 performed at a client device (2102). For example, instructions for performing the method are stored in the memory 2412 and executed by the processor(s) 2406 of a client device as described with regard to FIG. 19 and/or FIG. 24. Some operations described with regard to the method 2100 are, optionally, combined and/or the order of some operations is, optionally, changed. In some embodiments, the client device comprises (2104) memory that is limited to executing a predetermined set of functions based on an amount of CPU power of the client device (e.g., the client device is a thin client). For example, a portion of processing (e.g., graphics processing) may be performed at a server remote from the client device. In some embodiments, the client device comprises (2106) a graphics processing unit (GPU).

The client device receives (2108) a media stream that includes a media stream segment having a segment header and a plurality of frames of video data. The media stream segment has a first data size. In some embodiments, the segment header includes data for the plurality of frames. For example, the segment header may include byte information (e.g., a byte range) that specifies (e.g., identifies) the frames in the segment.

In some embodiments, before the media stream is received, the client device opens (2112) a session with a content server and the media stream is received from the content server. For example, the content server may be associated with a third-party that is operated by a provider distinct from the provider that operates the content management device and/or the client device. In some embodiments, an orchestrator 110 opens and/or manages the session between the client device 430 and the third-party CDN (e.g., as illustrated in FIGS. 4-6). In some embodiments, the media stream is received (2114) from a content storage device.

The client devices stores (2116) the media stream segment. For example, the client device (e.g., client device 130) includes local memory (e.g., cache) for storing the media stream segment. The client device generates (2118) a digest segment that corresponds to the media stream segment.

The digest segment includes (2120) a representation of the video data of the plurality of frames. In some embodiments, the representation of the video data of the plurality of frames includes (2122) the segment header. For example, as shown in FIG. 11, segment header 1102 in the media stream segment 1101 is included as segment header 1110 of digest segment 1109. In some embodiments, the representation only includes the segment header (e.g., the representation does not include any additional data other than the segment header). In some embodiments, segment header 1102 and segment header 1110 contain the same data (e.g., are the same header). In some embodiments, the representation of the video data of the plurality of frames includes at least one respective frame header that corresponds to a respective frame of the plurality of frames. For example, as shown in FIG. 11, each frame of frames 1103-1108 included in the media stream segment 1101 may contain a frame header, and the representation of the video data included in digest segment 1109 includes the frame headers (e.g., without including the video data of the frames).

In some embodiments, the digest segment does not include (2126) image content for at least one respective frame of the plurality of frames. For example, the digest segment includes the representation of the video data (e.g., the segment header), but does not include at least a portion of the video data that corresponds to the plurality of frames. In some embodiments, the representation of the video data of the plurality of frames includes (2128) an indication of a location and/or a data length of at least one frame of the plurality of frames of the media stream. For example, the representation of the video data includes information to indicate a current playback position of the media stream. For example, the representation includes a range, such as an indication of a start location and an indication of an end location of one or more frames of the plurality of frames (e.g., an identifier of a first byte and/or a last byte that correspond to an individual frame). In some embodiments, the representation of the video data includes (2130) a frame identifier for at least one respective frame of the plurality of frames.

The digest segment has (2132) a second data size that is smaller than the first data size. For example, the digest segment (e.g., without at least a portion of the video data) is a compressed version of the media stream segment that includes the representation of the video data of the plurality of frames such that a remote device (e.g., a server) can reconstruct the media stream segment to its same size (e.g., Reconstructed segment 1111 is a same size as original segment 1101 shown in FIG. 11). For example, the digest segment is a smaller data size such that, when transmitted to a remote device, less bandwidth is required to transmit the digest segment than would be required to transmit the full media stream segment.

The client device transmits (2134), to a remote device, the generated digest segment. For example, the remote device may be the virtual client virtual machine 103.

In some embodiments, the remote device is a server computing device (e.g., server computer system 2300).

Figure 21D:
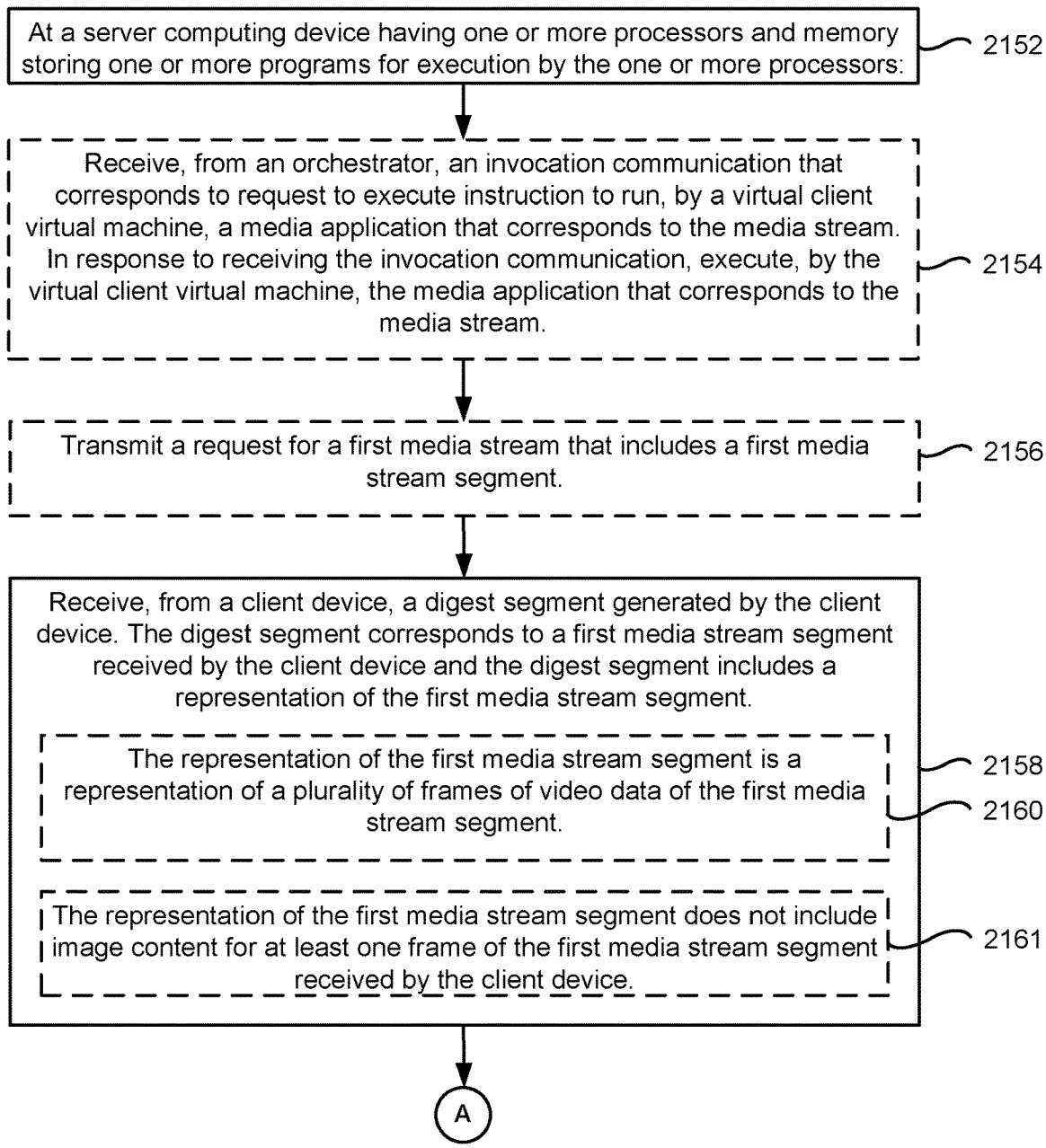
FIG. 21D-21E are flowcharts for a method of generating a command at a server computing device based on a digest segment, in accordance with some embodiments.
Figure 21E:
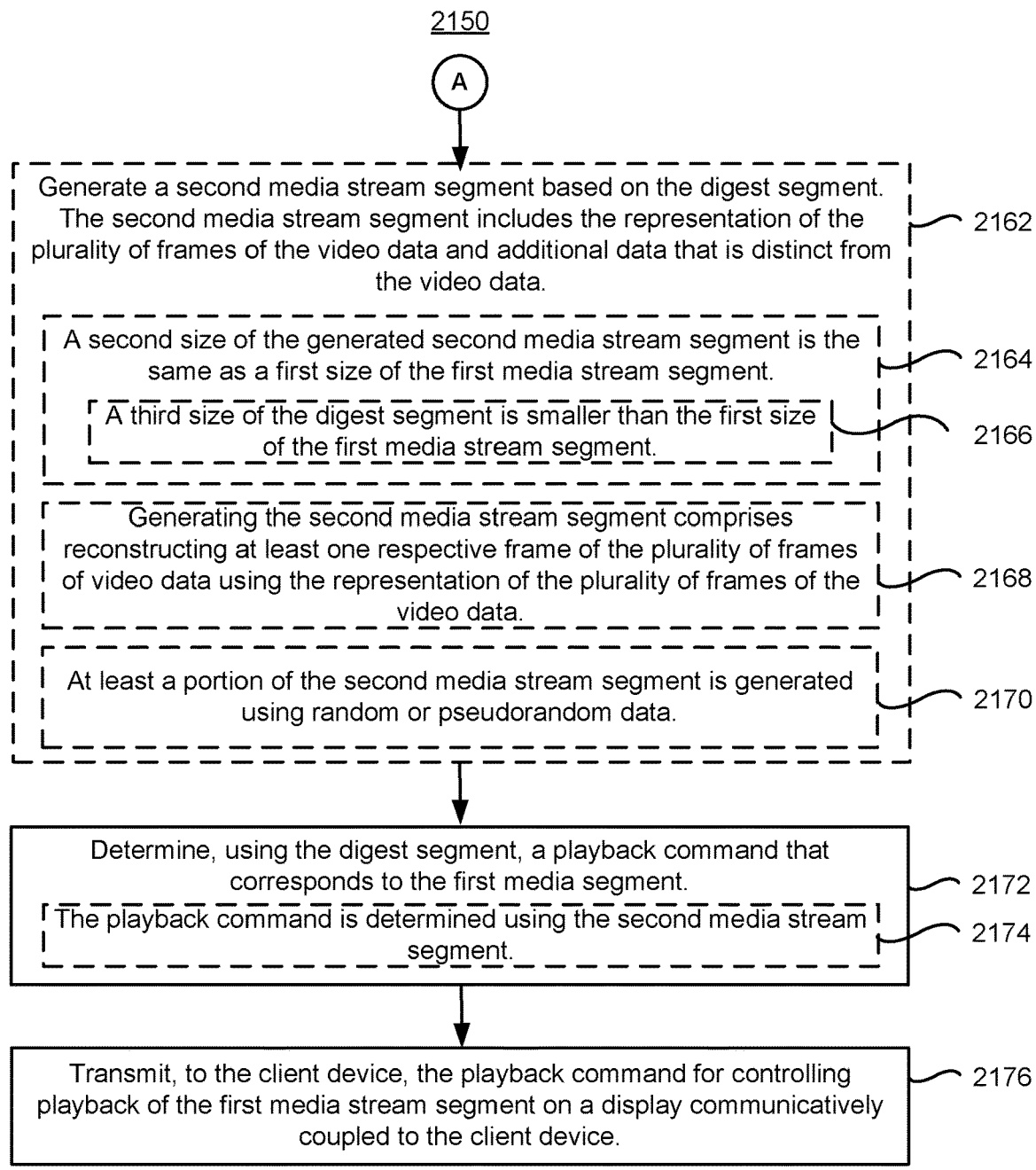
Figure 23:
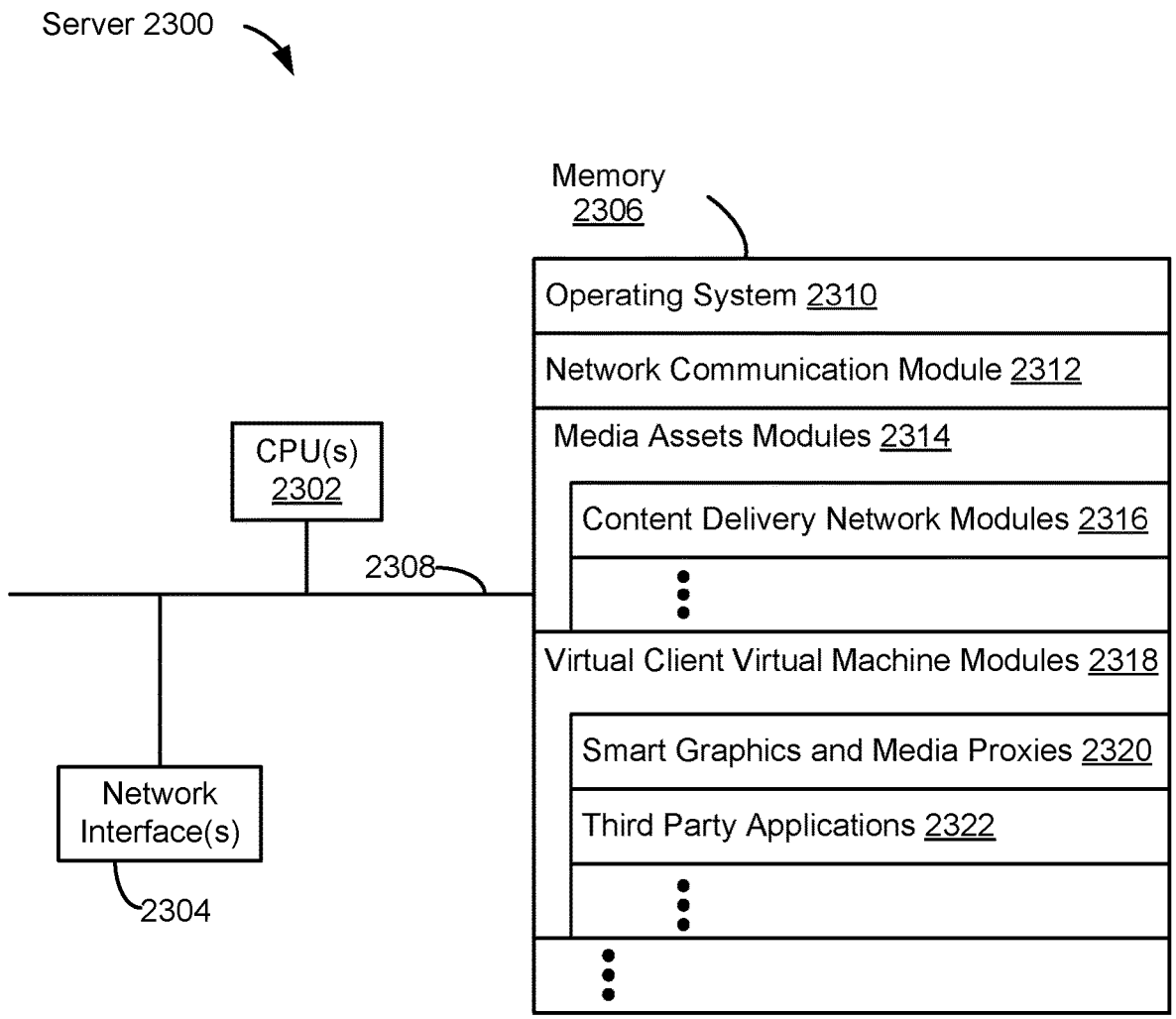
FIG. 23 is a block diagram of a server system, in accordance with some embodiments.

FIGS. 21D-21E illustrate a method 2150 for providing a playback command to a client device. In some embodiments, the method 2150 is performed by a server computer system 2300 as shown in FIG. 23. For example, instructions for performing the method are stored in the memory 2306 and executed by the processor(s) 2302 of the server computer system 2300. Some operations described with regard to the process 2150 are, optionally, combined and/or the order of some operations is, optionally, changed. The server computer system (e.g., a server computing device) has one or more processors and memory storing one or more programs for execution by the one or more processors.

In some embodiments, the server computer system 2300 is the remote device described in step 2134 above. The server computing device (2152) receives (2158), from a client device (e.g., client device 130), a digest segment generated by the client device. The digest segment corresponds to a first media stream segment received by the client device and the digest segment includes a representation of the first media stream segment. In some embodiments, the representation of the first media stream segment is a representation of a plurality of frames of video data of the first media stream segment (2160).

In some embodiments, the representation of the first media stream segment does not include (2161) image content for at least one frame of the first media stream segment received by the client device.

In some embodiments, prior to receiving the digest segment generated by the client device, the server computing device receives (2154), from an orchestrator, an invocation communication that corresponds to a request to execute instructions to run, by a virtual client virtual machine, a media application (e.g., application 101) that corresponds to the media stream. In some embodiments, the media application manages (e.g., is responsible for) playback of the media stream. For example, the media application is associated with a content provider that provides the media stream. In response to receiving the invocation communication, the server computing device executes, by the virtual client virtual machine, the media application that corresponds to the media stream. In some embodiments, the virtual client virtual machine (e.g., the media application) is running on the server computing device. In some embodiments, the virtual client virtual machine (e.g., the media application) is running on a server distinct from (e.g., and in communication with) the server computing device that receives the digest segment. For example, multiple servers in the server computer system may each be performing portions of the method described.

In some embodiments, prior to receiving the digest segment that corresponds to (e.g., represents) the first media stream segment, the server computing device transmits (2156) a request for a first media stream that includes the first media stream segment (e.g., as described with regard to 1002, FIG. 10). For example, the server computing device transmits a request to the client device to obtain the media stream from a content storage device and/or transmits a request to the content storage device to send the media stream to the client device.

In some embodiments, the server computing device generates (2162) a second media stream segment based on the digest segment. The second media stream segment includes the representation of the plurality of frames of the video data and additional data (e.g., dummy data) that is distinct from the video data. The additional data may include blank frames and/or random data.

In some embodiments, a second size of the generated second media stream segment is the same as a first size of the first media stream segment (2164). In some embodiments, the first and second sizes of the media stream segments comprise data sizes (e.g., in MB). In some embodiments, the first and second sizes of the media stream segments comprise a length (e.g., in time) of the segments. In some embodiments, the digest segment has a third size that is smaller than the first size of the first media stream segment (2166). For example, the second media stream includes Reconstructed Segment 1111 shown in FIG. 11, in which the representation of the plurality of frames 1113-1118 contains data (e.g., generated data, such as random data) that has a same size as the data of frames 1103-1108 of the original segment 1101 (but the reconstructed segment does not contain the video data of frames 1103-1108 of the original segment 1101).

In some embodiments, generating the second media stream segment comprises reconstructing (2168) at least one respective frame of the plurality of frames of video data using the representation of the plurality of frames of the video data. In some embodiments, at least a portion of the second media stream segment is generated (2170) using random or pseudorandom data (e.g., random ones and zeros).

In some embodiments, the server computing device determines (2172), using the digest segment, a playback command that corresponds to the first media stream segment and transmits, to the client device, (2176) the playback command for controlling playback of the first media stream segment on a display communicatively coupled to the client device. For example, the playback command includes a command to start, end, pause, and/or resume content. In some embodiments, the playback command includes an indication of a location (e.g., a frame) within the media segment that corresponds to the command.

In some embodiments, the playback command is determined using the second media stream segment (2174).

With reference to FIG. 21B, the client device receives (2136), from the remote device, a command (e.g., the playback command determined at the server computing device based on the second media stream segment) for playback of the media stream. The command for playback of the media stream is at least partially based on the digest segment transmitted to the remote device (e.g., the remote device uses the digest segment to determine the command for playback of the media stream). In some embodiments, the received command comprises (2138) an indication of a portion of the media stream to play back at the client device. For example, the received command includes identification of a frame at which the client is to begin playback. In some embodiments, the playback command is generated by the media application (e.g., executed on the VCVM).

In response to receiving the command, the client device displays (2140), on a display communicatively coupled to the client device, at least a portion of the stored media stream segment.

In some embodiments, the media stream segment is received from a first source (e.g., third-party CDN 105 associated with a first service provider). For example, the media stream segment is a full-screen or partial-screen video managed by a video playback API (e.g., OpenMax). In some embodiments, graphics data is received from a second source (e.g., a CDN associated with a second service provider). For example, graphics data can include one or more graphical elements (e.g., user interface elements) rendered via a graphics API (e.g., OpenGL). In some embodiments, the client device generates (2142) a content stream that combines the graphics data with the stored media stream segment. For example, the client device uses its GPU to overlay graphics data from the second source with the media stream segment received from the first source. In some embodiments, displaying the stored media stream segment includes displaying the graphics data combined with the stored media stream segment. In some embodiments, the first source is distinct from the second source (e.g., CDN 105 is associated with a first service provider distinct from the second service provider associated with a second CDN).

Figure 22A:
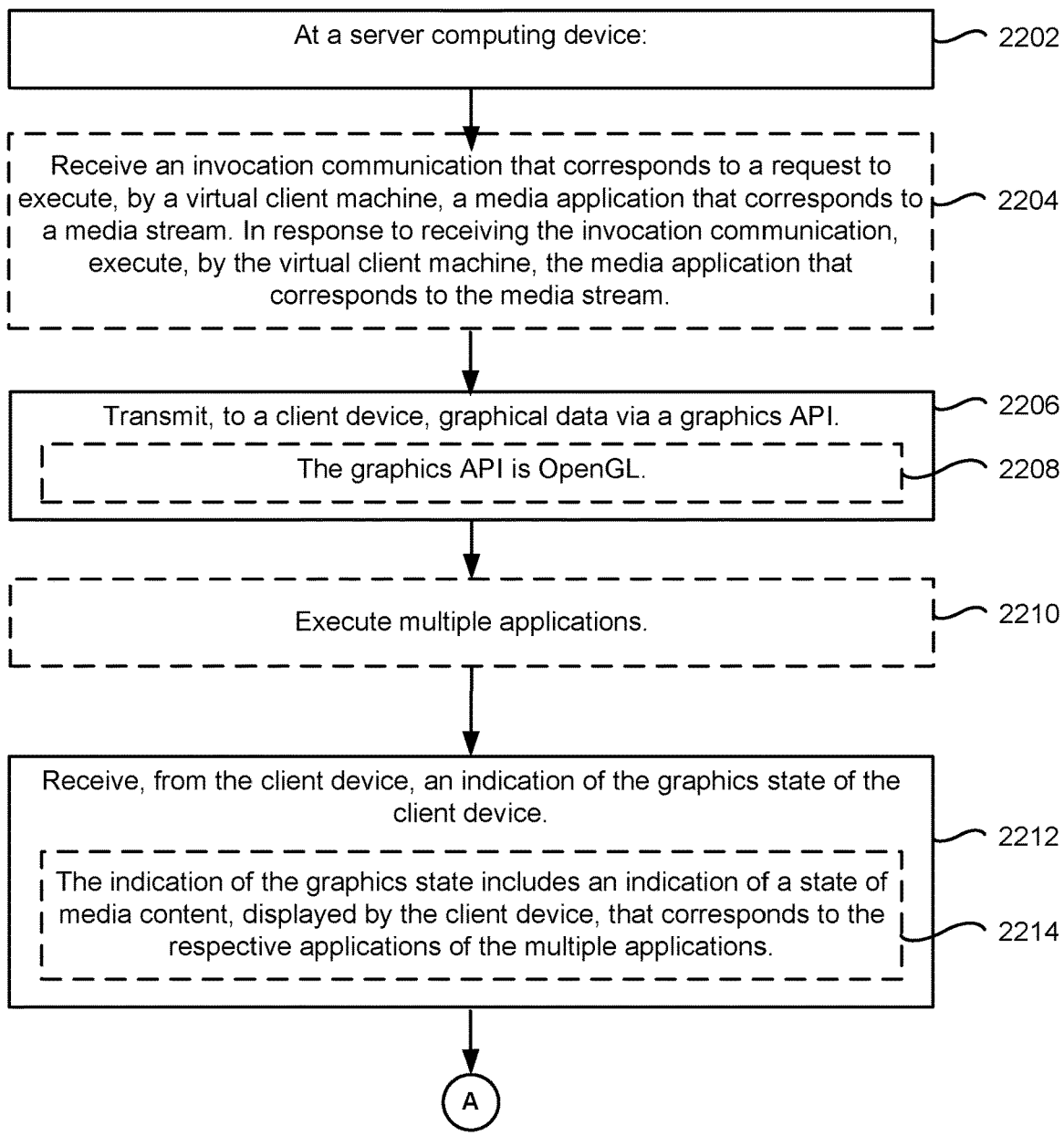
FIG. 22A-22B are flowcharts for a method of generating a command at a server computing device, in accordance with some embodiments.
Figure 22B:
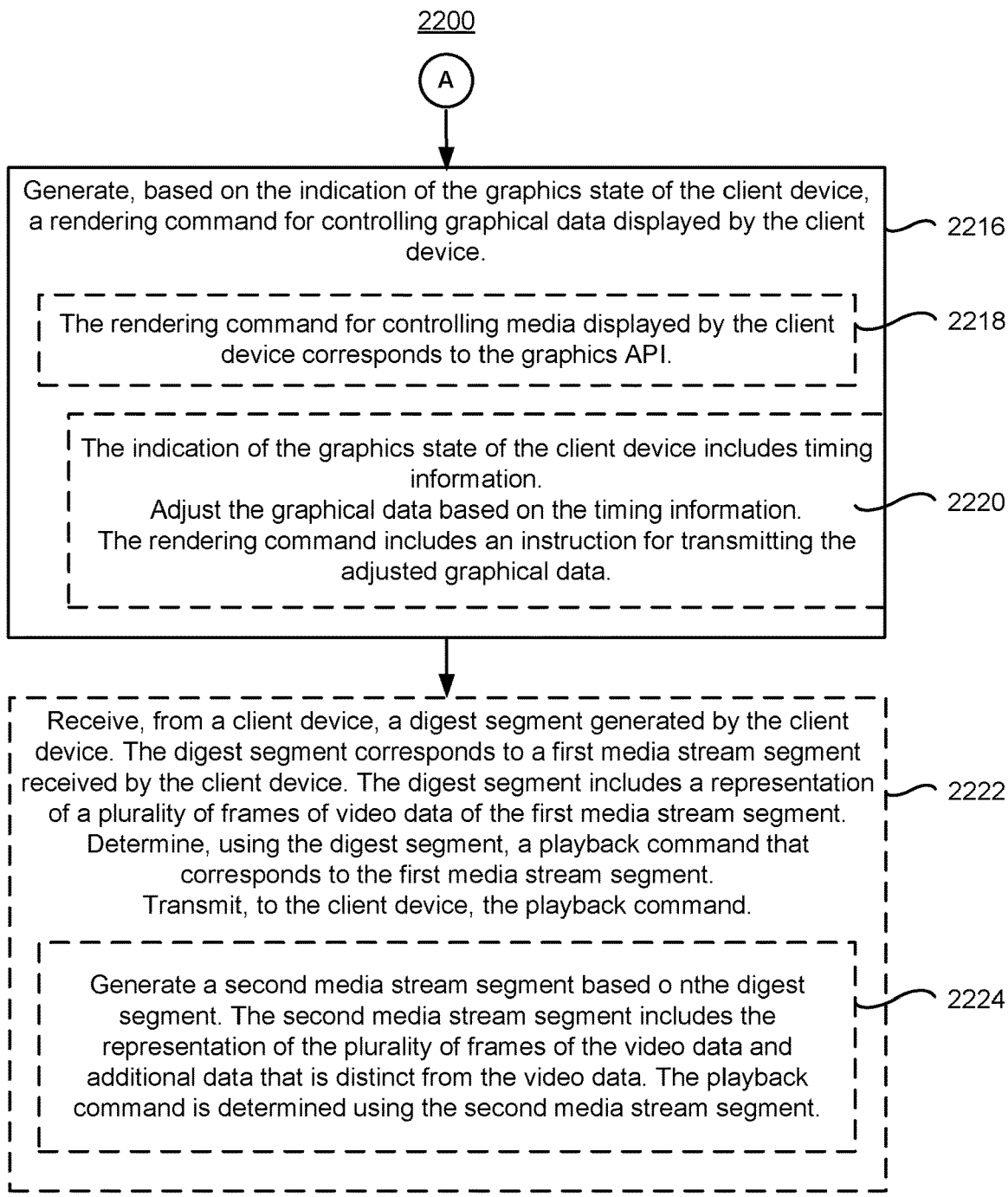

FIGS. 22A-22B illustrate a method 2200 for generating, at a server computing device, a rendering command for controlling graphical data displayed by a client device (e.g., distinct from the server computing device). In some embodiments, the server computing device is an application server that executes virtual client virtual machine 103. The method includes, at the server computing device (2202) (e.g., at server 2300, FIG. 23), transmitting (2206), to a client device (e.g., client device 130), graphical data via a graphics API. In some embodiments, prior to transmitting the graphical data, the server receives (2204) an invocation communication that corresponds to a request to execute, by a virtual client virtual machine 103, a media application that corresponds to a media stream. In response to receiving the invocation communication, the server computing device executes, by the virtual client virtual machine 103, the media application that corresponds to the media stream.

In some embodiments, the graphics API is OpenGL (2208).

In some embodiments, the server computing device executes (2210) multiple applications.

The server computing device receives (2212), from the client device, an indication of the graphics state of the client device. In some embodiments, the indication of the graphics state includes (2214) an indication of a state of media content, displayed by the client device, that corresponds to the respective applications of the multiple applications.

The server computing device generates (2216), based on the indication of the graphics state of the client device, a rendering command for controlling graphical data displayed by the client device.

In some embodiments, the rendering command for controlling media displayed by the client device corresponds (2218) to the graphics API.

In some embodiments, the indication of the graphics state of the client device includes (2220) timing information. In some embodiments, the server computing device adjusts the graphical data based on the timing information. In some embodiments, the rendering command includes one or more instructions for transmitting the adjusted graphical data. In some embodiments, adjusting the graphical data includes reducing the size of the graphical data. For example, adjusting graphical data that corresponds to a video stream includes transmitting an image in lieu of transmitting the video stream.

In some embodiments, the server computing device receives (2222), from a client device, a digest segment generated by the client device. In some embodiments, the digest segment is transmitted with the indication of the graphics state (e.g., transmitted together in a single transmission). In some embodiments, the digest segment is transmitted separately from the indication of the graphic state of the client device. In some embodiments, the indication of the graphics state of the client includes the digest segment. The digest segment corresponds to a first media stream segment received by the client device, and the digest segment includes a representation of a plurality of frames of video data of the first media stream segment. In some embodiments, the server computing device determines, using the digest segment, a playback command that corresponds to the first media stream segment; and transmits, to the client device, the playback command.

In some embodiments, the server computing device generates (2224) a second media stream segment based on the digest segment. The second media stream segment includes the representation of the plurality of frames of the video data and additional data that is distinct from the video data and the playback command is determined using the second media stream segment.

In some embodiments, the method 2200 is performed by a server computer system 2300 as shown in FIG. 23. For example, instructions for performing the method are stored in the memory 2306 and executed by the processor(s) 2302 of the server computer system 2300. Some operations described with regard to the process 2200 are, optionally, combined and/or the order of some operations is, optionally, changed.

FIG. 23 is a block diagram illustrating an exemplary server computer system 2300 in accordance with some implementations. In some embodiments, server computer system 2300 is an application server that executes virtual client virtual machine 103. The server computer system 2300 typically includes one or more central processing units/cores (CPUs) 2302, one or more network interfaces 2304, memory 2306, and one or more communication buses 2308 for interconnecting these components.

Memory 2306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 2306, optionally, includes one or more storage devices remotely located from one or more CPUs 2302. Memory 2306, or, alternatively, the non-volatile solid-state memory device(s) within memory 2306, includes a non-transitory computer-readable storage medium. In some implementations, memory 2306, or the non-transitory computer-readable storage medium of memory 2306, stores the following programs, modules and data structures, or a subset or superset thereof:
- an operating system 2310 that includes procedures for handling various basic system services and for performing hardware dependent tasks;
- a network communication module 2312 that is used for connecting the server computer system 2300 to other computing devices via one or more network interfaces 2304 (wired or wireless) connected to one or more networks such as the Internet, other WANs, LANs, PANs, MANs, VPNs, peer-to-peer networks, content delivery networks, ad-hoc connections, and so on;
- one or more media assets modules 2314 for enabling the server computer system 2300 to perform various functions, the media assets modules 2314 including, but not limited to:
  - content delivery network modules 2316 for retrieving and/or processing media content received, for example, from CDN 105
- one or more virtual client virtual machine modules 2318 for executing one or more VCVM(s) 103; in some implementations, the one or more virtual client virtual machine modules 2318 include:
  - smart graphics and media proxies 2320 for tracking graphical states of client devices and/or processing graphics content (e.g., SGMP 2320 includes SGMP 102 described above with reference of FIG. 1); and
  - third party applications 2322 for execution on the VCVM(s) 103 (e.g., applications 2322 include third-party applications 101 described above).

In some implementations, the server computer system 2300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 23 illustrates the server computer system 2300 in accordance with some implementations, FIG. 23 is intended more as a functional description of the various features that may be present in one or more media content servers than as a structural schematic of the implementations described herein. In practice, items shown separately could be combined and some items could be separated. For example, some items shown separately in FIG. 23 could be implemented on single servers and single items could be implemented by one or more servers. The actual number of servers used to implement server computer system 2300, and how features are allocated among them, will vary from one implementation to another and, optionally, depends in part on the amount of data traffic that the server system handles during peak usage periods as well as during average usage periods.

Figure 24:
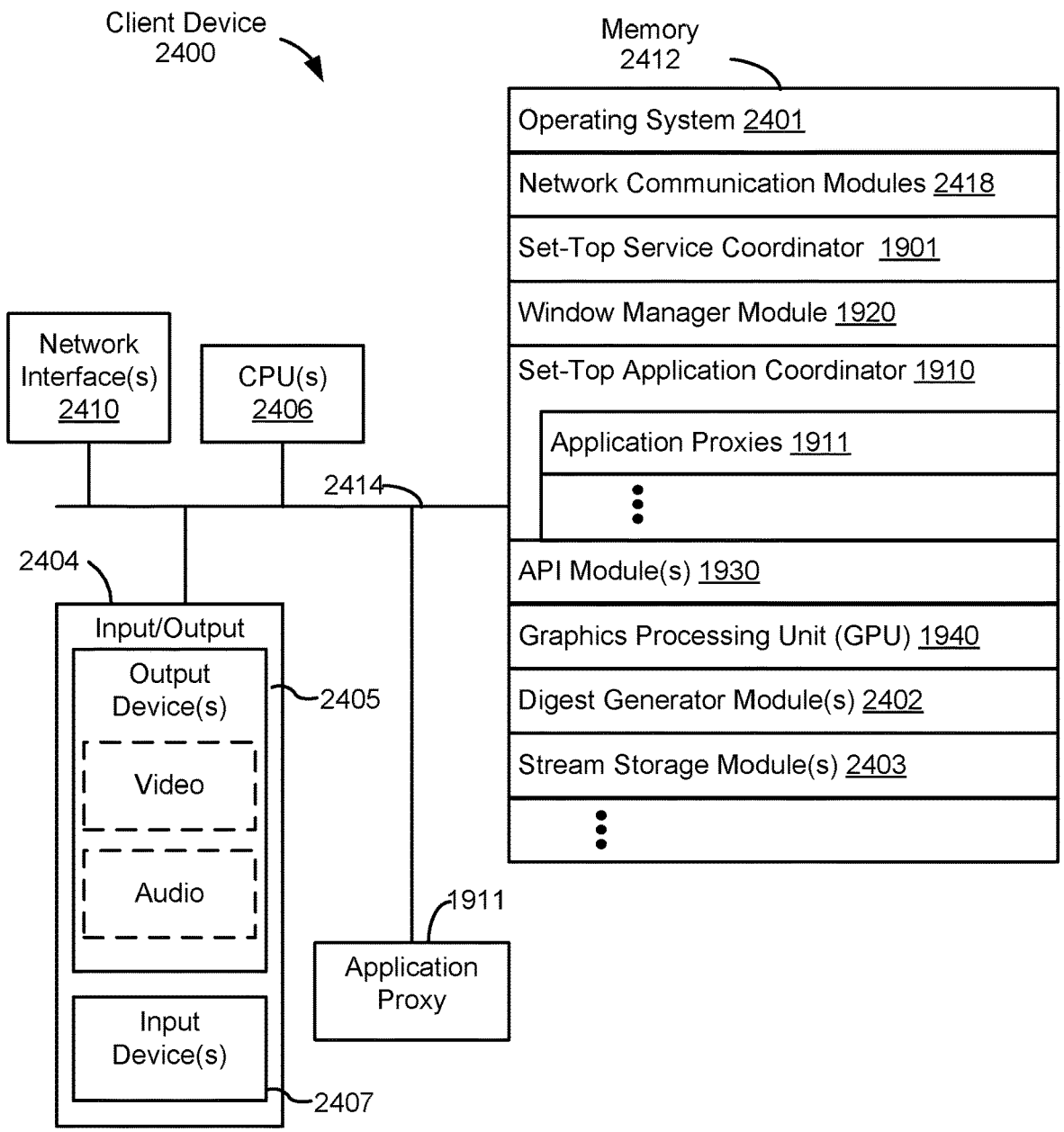
FIG. 24 is a block diagram of a client device, in accordance with some embodiments.

FIG. 24 is a block diagram illustrating an exemplary client device 2400 (e.g., client device 130 of FIG. 1) in accordance with some implementations. The client device 2400 typically includes one or more central processing units (CPU(s), e.g., processors or cores) 2406, one or more network (or other communications) interfaces 2410, memory 2408, and one or more communication buses 2414 for interconnecting these components. The communication buses 2414 optionally include circuitry (sometimes called a chipset) that interconnects and controls communications between system components.

As also shown in FIG. 19, the client device includes output device(s), such as video output 1971 and audio output 1972, and input device(s) 1970. In some implementations, the input devices 1970 include a keyboard, a remote controller, or a track pad. Alternatively, or in addition, the client device includes (e.g., is coupled to) a display device (e.g., to display video output 1971).

In some implementations, the one or more network interfaces 2410 include wireless and/or wired interfaces for receiving data from and/or transmitting data to other client devices 2400, a server computer system 2300, and/or other devices or systems. In some implementations, data communications are carried out using any of a variety of custom or standard wired protocols (e.g., USB, Firewire, Ethernet, etc.).

Memory 2412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 2412 may optionally include one or more storage devices remotely located from the CPU(s) 2406. Memory 2412, or alternately, the non-volatile memory solid-state storage devices within memory 2412, includes a non-transitory computer-readable storage medium. In some implementations, memory 2412 or the non-transitory computer-readable storage medium of memory 4212 stores the following programs, modules, and data structures, or a subset or superset thereof:

- an operating system 2401 that includes procedures for handling various basic system services and for performing hardware dependent tasks;
- network communication module(s) 2418 for connecting the client device 2400 to other computing devices (e.g., client devices 103, server computer system 2300, and/or other devices) via the one or more network interface(s) 2410 (wired or wireless);
- a set-top service coordinator 1901 for performing the functions as described with reference to FIG. 19;
- a window manager module 1920 for performing the functions as described with reference to FIG. 19;
- a set-top application coordinator 1910 for performing the functions as described with reference to FIG. 19, the set-top application coordinator having additional module(s), including but not limited to:
  - one or more application proxies 1911 for communicating (e.g., graphical states) with third-party applications (e.g., application 101);
- API Module(s) 1930 for managing a variety of APIs, including, for example, OpenGL and/or OpenMAX;
- Graphics Processing Unit (GPU) 1940 for rendering graphical content, including frame buffering and display control;
- a digest generator module(s) for generating digest streams in accordance with some implementations;
- a stream storage module(s) for storing original media content (e.g., from CDN 105), such as storing an original segment of a video stream;
- input/output module 2404, including output device 2405 for outputting video and/or audio content (e.g., to be reproduced by one or more displays and/or loudspeakers coupled with client device 2400) and/or input device 2407 for receiving user input (e.g., from a component of client device 2400 (e.g., keyboard, mouse, and/or touchscreen) and/or a control coupled to client device 2400 (e.g., a remote control)).

In some embodiments, a method for generating a media stream that includes a media stream segment and graphics data is provided. The method comprises receiving, from a first device that corresponds to a first content provider (e.g., CDN 105), a media stream segment (e.g., media assets 121), and receiving, from a second device that corresponds to a second content provider (e.g., a second CDN distinct from CDN 105), graphics data (e.g., user interface graphics). The method includes generating (e.g., at client device 130) a media stream that includes the media stream segment and the graphics data for display by a display communicatively coupled to a client device.

In some embodiments, the media stream segment and the graphics data are received by the client device and the graphical data is rendered by the client device, such as a GPU of the client device.

In some embodiments, the media stream segment and the graphics data are received by an orchestrator device and the graphical data is rendered by the orchestrator device, such as the GPU of the orchestrator device. For example, as shown in FIGS. 4-6, when the client device does not include a GPU (e.g., in the case of legacy STBs) to render the media stream, the orchestrator 110 includes a Virtual GPU 403, to render the media stream segment and graphics data into the media stream.

In some embodiments, the graphical data is rendered via a graphics API (e.g., OpenGL).

In some embodiments, the media stream is managed via a video playback API (e.g., OpenMAX).

In summary, a previously unavailable Internet-wide integration that unites operator-provided virtual application services with third-party application services is provided. In some embodiments, services from both managed and unmanaged networks are combined, providing optimized video services to virtually any network connected device. The result is a smooth and responsive interactive and on-demand service from virtually any source to virtually any networked media device, even including legacy cable television installations.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 2306 and the memory 2412) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 2306 and the memory 2412 include one or more storage devices remotely located from the CPU(s) 2302 and 2406. The memory 2306 and the memory 2412, or alternatively the non-volatile memory device(s) within these memories, comprises a non-transitory computer readable storage medium.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method comprising:
   at a server computing device having one or more processors and memory storing one or more programs for execution by the one or more processors:
      receiving, from a client device, a digest segment generated by the client device, wherein:
         the digest segment corresponds to a first media stream segment, the first media stream segment received by the client device from a content provider distinct from the server, and
         the digest segment includes a representation for each of a plurality of frames of video data of the first media stream segment, wherein the digest segment excludes frame data for each of the plurality of frames of video data and includes header information for the plurality of frames of video data;
      generating a second media stream segment based on the digest segment, wherein the second media stream segment includes the header information for the plurality of frames of video data and dummy data that is distinct from the video data;
      determining, using the second media stream segment, a playback command that corresponds to the first media stream segment; and
      transmitting, to the client device, the playback command for controlling playback of the first media stream segment on a display communicatively coupled to the client device.

2. The method of claim 1, wherein a second size of the generated second media stream segment is the same as a first size of the first media stream segment.

3. The method of claim 2, wherein a third size of the digest segment is smaller than the first size of the first media stream segment.

4. The method of claim 1, wherein generating the second media stream segment comprises reconstructing at least one respective frame of the plurality of frames of video data using the representation for the at least one respective frame.

5. The method of claim 1, wherein at least a portion of the second media stream segment is generated using random or pseudorandom data.

6. The method of claim 1, including, prior to receiving the digest segment that corresponds to the first media stream segment, transmitting a request for a first media stream that includes the first media stream segment.

7. The method of claim 1, including:
   prior to receiving the digest segment generated by the client device, receiving, from an orchestrator, an invocation communication that corresponds to request to execute instructions to run, by a virtual client virtual machine, a media application that corresponds to the media stream; and
   in response to receiving the invocation communication, executing, by the virtual client virtual machine, the media application that corresponds to the media stream.

8. A non-transitory computer readable storage medium storing one or more programs for execution by one or more processors of a server system the one or more programs including instructions for:
   receiving, from a client device, a digest segment generated by the client device, wherein:
      the digest segment corresponds to a first media stream segment, the first media stream segment received by the client device from a content provider distinct from the server, and
      the digest segment includes a representation for each of a plurality of frames of video data of the first media stream segment, wherein the digest segment excludes frame data for each of the plurality of frames of video data and includes header information for the plurality of frames of video data;
   generating a second media stream segment based on the digest segment, wherein the second media stream segment includes the header information for the plurality of frames of video data and dummy data that is distinct from the video data;
   determining, using the second media stream segment, a playback command that corresponds to the first media stream segment; and
   transmitting, to the client device, the playback command for controlling playback of the first media stream segment on a display communicatively coupled to the client device.

9. A server system, comprising one or more processors and memory storing one or more programs for execution by the one or more processors, the one or more programs including instructions for:
   receiving, from a client device, a digest segment generated by the client device, wherein:
      the digest segment corresponds to a first media stream segment, the first media stream segment received by the client device from a content provider distinct from the server, and
      the digest segment includes a representation for each of a plurality of frames of video data of the first media stream segment, wherein the digest segment excludes frame data for each of the plurality of frames of video data and includes header information for the plurality of frames of video data;
   generating a second media stream segment based on the digest segment, wherein the second media stream segment includes the header information for the plurality of frames of video data and dummy data that is distinct from the video data;
   determining, using the second media stream segment, a playback command that corresponds to the first media stream segment; and
   transmitting, to the client device, the playback command for controlling playback of the first media stream segment on a display communicatively coupled to the client device.

10. The server system of claim 1, wherein a second size of the generated second media stream segment is the same as a first size of the first media stream segment.

11. The server system of claim 10, wherein a third size of the digest segment is smaller than the first size of the first media stream segment.

12. The server system of claim 1, wherein generating the second media stream segment comprises reconstructing at least one respective frame of the plurality of frames of video data using the representation of the at least one respective frame.

13. The server system of claim 1, wherein at least a portion of the second media stream segment is generated using random or pseudorandom data.

14. The server system of claim 9, including, prior to receiving the digest segment that corresponds to the first media stream segment, transmitting a request for a first media stream that includes the first media stream segment.

15. The server system of claim 9, including:

prior to receiving the digest segment generated by the client device, receiving, from an orchestrator, an invocation communication that corresponds to request to execute instructions to run, by a virtual client virtual machine, a media application that corresponds to the media stream; and in response to receiving the invocation communication, executing, by the virtual client virtual machine, the media application that corresponds to the media stream.

16. The method of claim 1, wherein the header information comprises an unmodified segment header for the first media stream segment.

17. The method of claim 1, wherein the header information includes frame headers for frames in the plurality of frames of video data.

18. The method of claim 1, wherein the server system executes an application having an API, and the API of the application generates the playback command onto the second media stream segment; and the method further comprises forwarding the playback command to the client device to be overlaid with the content received from the content provider.

19. The method of claim 1, wherein the playback command that is determined using the second media stream segment comprises a command that instructs the client device to initiate playback of the first media stream segment that was received by the client device.

* * * * *

UNITED STATES PATENT AND TRADEMARK OFFICE
CERTIFICATE OF CORRECTION

| | | |
|---|---|---|
| PATENT NO. | : 11,128,903 B2 | Page 1 of 1 |
| APPLICATION NO. | : 16/721125 | |
| DATED | : September 21, 2021 | |
| INVENTOR(S) | : Brockmann et al. | |

It is certified that error appears in the above-identified patent and that said Letters Patent is hereby corrected as shown below:

In the Claims

Claim 10, Column 33, Line 1, delete "claim 1," and insert --claim 9--;

Claim 12, Column 33, Line 7, delete "claim 1," and insert --claim 9--;

Claim 13, Column 33, Line 12, delete "claim 1," and insert --claim 9--.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*